(12) United States Patent
Bornhoevd et al.

(10) Patent No.: US 8,452,663 B2
(45) Date of Patent: May 28, 2013

(54) SYSTEMS AND METHODS FOR PROCESSING AUTO-ID DATA

(75) Inventors: Christof Bornhoevd, San Francisco, CA (US); Mariano A. Cilia, Darmstadt (DE); Pablo E. Guerrero, Darmstadt (DE); Philipp C. K. Sachs, Darmstadt (DE); Alejandro P. Buchmann, Grieshiem (DE)

(73) Assignee: SAP AG, Walldorf, DE (US)

( * ) Notice: Subject to any disclaimer, the term of this patent is extended or adjusted under 35 U.S.C. 154(b) by 1652 days.

(21) Appl. No.: 11/429,151

(22) Filed: May 4, 2006

(65) Prior Publication Data

US 2007/0260470 A1    Nov. 8, 2007

(51) Int. Cl.
*G06Q 1/14*    (2012.01)
*G06Q 10/00*   (2012.01)
*G06Q 30/00*   (2012.01)

(52) U.S. Cl.
USPC ............................... 705/22; 705/28; 705/330

(58) Field of Classification Search
None
See application file for complete search history.

(56) References Cited

U.S. PATENT DOCUMENTS

| | | | |
|---|---|---|---|
| 2003/0132853 A1* | 7/2003 | Ebert ...................... | 340/825.49 |
| 2003/0132854 A1* | 7/2003 | Swan et al. ............. | 340/825.49 |
| 2004/0024768 A1* | 2/2004 | Haller ..................... | 707/100 |
| 2004/0075549 A1* | 4/2004 | Haller ..................... | 340/522 |
| 2004/0181461 A1* | 9/2004 | Raiyani et al. ........... | 705/26 |
| 2006/0091999 A1* | 5/2006 | Howarth .................. | 340/10.3 |
| 2006/0267736 A1* | 11/2006 | Tiernay et al. ........... | 340/10.51 |
| 2007/0163472 A1* | 7/2007 | Muirhead .................. | 108/51.3 |
| 2008/0294585 A1* | 11/2008 | Hwang et al. ............ | 706/47 |

OTHER PUBLICATIONS

Christof Bornhovd et al; "Integrating Automatic Data Acquisition with Business Processes Experiences with SAPs Auto-ID Infrastructure"; 30th VLDB Confererence Proceedings 2004.
Sean Clark et al; "Auto-ID Savant Specification 1.0"; White Paper MIT-AUTOID-TM-003; Sep. 2003.
Mariano Cilia et al; "Moving Active Functionality from Centralized to Open Distributed Hereogeneous Enviornments"; 9th ICCIC Conference Proceedings; pp. 195-210; 2001.
Mariano Cilia et al; "An Active Functionality Service for E-Business Applications"; ACM SIGMOD Record, vol. 31, Issue 1; ACM Press; pp. 24-30; Mar. 2002.
Mariano Cilia; "An Active Functionality Service for Open Distributed Hereogeneous Enviornments"; Ph.D. Thesis; ISBN 3-8322-0790-2; Shaker-Verlag,Darmstadt,Germany; Aug. 2002.
Shariq Rizvi; "Complex Event Processing Beyond Active Databases: Streams and Uncertainties"; MS Thesis; EECS Dept, UC Berkeley; Dec. 2005.
Sean Rooney et al; "Edge Server Software Architecture for Sensor Applications"; Proceedings of the 2005 Symposium on Applications and the Internet; IEEE Press; Jan. 2005.

* cited by examiner

*Primary Examiner* — Matthew T Sittner
(74) *Attorney, Agent, or Firm* — Fountainhead Law Group PC

(57) ABSTRACT

Embodiments of the present invention improve data processing, and in particular, improve rule engines for data processing and improve processing auto-ID data. In one embodiment, the present invention includes a gateway layer between a auto-ID device layer and an auto-ID node layer for processing data. The gateway layer may incorporate a rule engine for processing data. In another embodiment, the present invention includes a rule processor where rules are activated and deactivated automatically to reduce system overhead. In another embodiment, the rule engine is composed of multiple services that can be omitted if they are not needed for the processing of a given rule set to reduce the footprint and resource consumption of the rule engine.

20 Claims, 20 Drawing Sheets

SYSTEMS AND METHODS FOR PROCESSING AUTO-ID DATA

CROSS REFERENCE TO RELATED APPLICATIONS

Not Applicable.

BACKGROUND

The present invention relates to data processing systems, and in particular, to systems and methods for processing data, including auto-ID data, using rule engines.

Auto-ID systems are highly distributed systems that include information about themselves. These devices are sometimes referred to as "smart item devices" and are referred to herein as "auto-ID devices." Auto-ID systems are used, for example, to identify or otherwise obtain information about individual products or items that are to be manufactured, bought or sold, transported, or otherwise used in commerce. For example, information regarding a physical object, such as a pallet on a shipping dock, may be stored in association with an electronic identifier (e.g., a tag ID) or a sensor that is affixed to the pallet or to goods on the pallet. Then, some sort of auto-ID device, such as a reader or sensor, may be used to identify the physical object or the temperature, for example, of the object by accessing the identifier and/or the sensor. Accordingly, auto-ID devices may generate auto-ID data corresponding to the products or objects that they are associated with. As used herein, auto-ID data are data that identifies or describes a real world object (e.g., RFID data) or data that describes the physical environment of a real world object (e.g., sensor data). The accessed information may be sent to a computer system for storage and processing. For example, a brand name of the object and/or the temperature of the object may be read, transmitted to a computer system, stored, and processed.

Radio frequency identification ("RFID") tags that contain information about the object they are associated with provide a simple form of a smart item device. RFID tags typically combine a modest storage capacity with a means of wirelessly communicating stored information like an electronic product code (EPC) to an RFID reader. In a supply chain management context, an object to be tagged is usually a pallet, a case or even a single sales item. Passive RFID tags require no on-board battery and can be read from a distance ranging from a few centimeters to a few meters. Active tags, on the other hand, come with an on-board battery, which provides larger read ranges and memory sizes but also higher unit cost and size and a limited lifespan of typically 3-5 years. Another example of a smart device in this context is an environmental sensor, such as a temperature or humidity sensor, which can provide a more complete picture of a tracked object and its physical environment.

Through automatic, real-time object tracking, smart item technology can provide companies with more accurate data about their business operations in a more timely fashion, as well as helping to streamline and automate the operations themselves. This leads to cost reduction and additional business benefits like increased asset visibility, improved responsiveness, and even extended business opportunities. However, bridging the gap between the physical and the digital world requires a flexible and scalable system architecture to integrate automatic data acquisition with existing business processes.

FIG. 1 illustrates a typical auto-ID system 100. Auto-ID system 100 can be divided into a device layer 101, a device operation layer 102, a bridging layer 103 (e.g., a business process bridging layer), and an application layer 104. Device layer 101 may include a variety of different auto-ID devices, such as RFID tags 110 and 112 or sensors 111, for example. Different types of RFID or sensor devices can be supported via a hardware-independent low-level interface. The device layer consists of the basic operations for reading and writing data and a publish/subscribe interface to report observation events. By implementing an application program interface ("API"), different kinds of "smart item" devices can be deployed within the Auto-ID infrastructure. Besides RFID readers, these devices can include environmental sensors, or programmable logic controller ("PLC") devices. Device operation layer 102 coordinates multiple devices. It may also provide functionality to filter, condense, aggregate, and adjust received sensor data before passing it on to the next layer. This layer is formed by one or more Device Controllers ("DC") 120 and 121. The bridging layer 103 associates incoming observation messages with existing business processes. At this layer, status and history information of tracked objects is maintained. This information may include object location, aggregation information, and information about the environment of a tagged object. This layer may include an "Auto-ID Node" ("AIN") 130 including a complex and powerful data processing software component. The bridging layer may further include a storage facility, such as a database repository 132, for storing auto-ID data and an auto-ID administrator component 131 for managing the auto-ID node. Finally, application layer 104 supports computer applications that use the incoming auto-ID information, such as business processes of enterprise applications 140 including a Supply Chain Management (SCM), a Customer Relationship Management (CRM), or an Asset Management application, for example. Application layer 104 may include databases 141, such as a data warehouse, and a portal 142 for accessing the applications.

FIG. 1 illustrates a typical auto-ID system 100. FIG. 2 illustrates an example use of an auto-ID system. Effective deployment of RFID technology can make it easier for business partners to acquire and share real-time data about goods and conduct transactions electronically. If a supplier ships 12 pallets of goods to a retail distribution center, passive RFID tags may be attached to them. At layer 250, an application may create a delivery document at step 201 that includes an Advanced Shipping Notice ("ASN") and electronic product codes ("EPC"). The RFID tags on the pallets may be scanned automatically as they leave the supplier's loading dock. When the truck door is closed and sealed with an RFID bolt seal, scanning the bolt seal could trigger the supplier's internal system to send the delivery document to the retailers RFID system automatically at 202.

On the other end, the retailer's auto-ID node 260 receives the ASN and is able to read and store it at 203. The retailer can then use the ASN to verify the accuracy of the shipment once it arrives and is unloaded from the truck. When the retailer scans the RFID tags on the 12 arriving pallets at 204 and 207 using readers 270, the raw data is transmitted by the device controllers ("DC") to the auto-ID node 260. The auto-ID node compares the received information with the information in the ASN at 205 and 208. If the information matches, the retailer's auto-ID node can automatically confirm that the shipment arrived by generating and transmitting a report 233 to a back-end application at 209. This may automatically trigger a message to the supplier to generate an electronic invoice, for example. One or more of the retailer's back-end application may continue execution at 210 based on the information from the auto-ID node. If the information on the tags and the ASN do not match up, the receiver's system may request that the supplier's system confirm the shipment. From FIGS. 1 and 2 it can be seen that an almost infinite number of business process rules could be applied to an auto-ID system taking advantage of the availability of auto-ID data.

However, one problem with existing auto-ID systems is that a potentially vast amount of information may be acquired. For example, a certain number of readers may access auto-ID data from a number of tags or sensors. Moreover, the desired methods (e.g., business rules) for processing such information may change over time. Typically, raw data processing is carried out on the Auto-ID node 103 in the bridging layer 103 in the form of business rules that are executed in a monolithic AIN component. However, it is generally desirable to develop a more distributed and flexible architecture which includes moving part of the business logic closer to the point of observation and reacting locally for better system scalability and throughput. However, lower level devices typically have limited memory and computation power. Therefore, the processing of complex business rules in the form they are currently expressed and executed on the AIN is not always possible on the smart devices, like RFID or sensor nodes.

Thus, there is a need for improved auto-ID data processing. The present invention solves these and other problems by providing improved systems and methods for processing auto-ID data.

SUMMARY

Embodiments of the present invention improve data processing, and in particular, improve rule engines for data processing and improve processing auto-ID data. In one embodiment, the present invention includes a method of processing data comprising receiving auto-ID data in a first system from one or more auto-ID devices, processing the auto-ID data in the first system using a plurality of rules that specify particular processing methods in a plurality of available processing methods on the first system, and sending at least a portion of the auto-ID data to a second system for processing by a second plurality of rules that specify particular processing methods in a second plurality of available processing methods on the second system.

In another embodiment, the present invention includes a method of processing data comprising storing a plurality of predefined rules, wherein each predefined rule has one or more corresponding particular processing methods in a plurality of available processing methods, and wherein a first portion of the plurality of predefined rules are in an activated state and a second portion of the plurality of predefined rules are in an inactivated state, executing one or more methods corresponding to the first portion of the plurality of predefined rules, and activating one or more of the second portion of the plurality of predefined rules based on at least one of the executed methods.

In another embodiment, the present invention includes an apparatus including an auto-ID processing gateway comprising a first input coupled to one or more auto-ID devices, a first output coupled to at least one auto-ID node, memory for storing information received from the one or more auto-ID devices and information received from the auto-ID node, and a rule engine for processing the auto-id data using a plurality of rules that specify particular processing methods in a plurality of available processing methods on said gateway.

In one embodiment, the rule engine is build on a component or module-based or service-oriented architecture, which provides flexible configuration of the rule execution flow. For instance, if the condition part in a rule definition is omitted, the flow of execution may change and the event detection may be connected directly to the action. Similarly, event filters can be placed between an event source and a complex event detector without requiring code changes for these components. A flexible rule engine that is able to omit processing steps like event composition or condition evaluation based on the given rule set reduces the footprint of the rule engine for a given rule set. Accordingly, sophisticated rules can be loaded and run on an as-needed basis on a gateway with limited processing capabilities.

The following detailed description and accompanying drawings provide a better understanding of the nature and advantages of the present invention.

DETAILED DESCRIPTION

Described herein are techniques for processing data, including auto-ID data. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
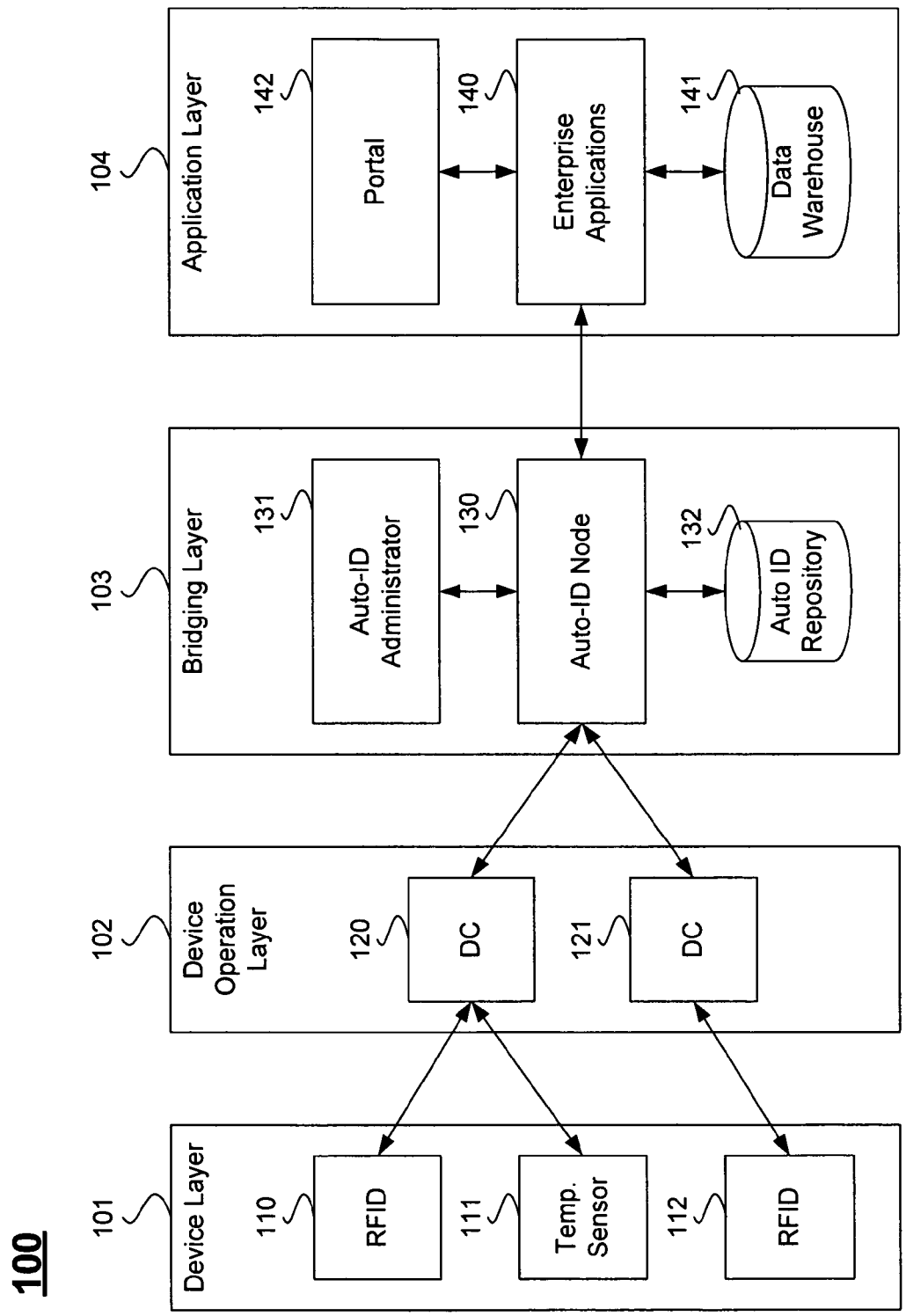
FIG. 1 illustrates a typical auto-ID system 100.
Figure 2:
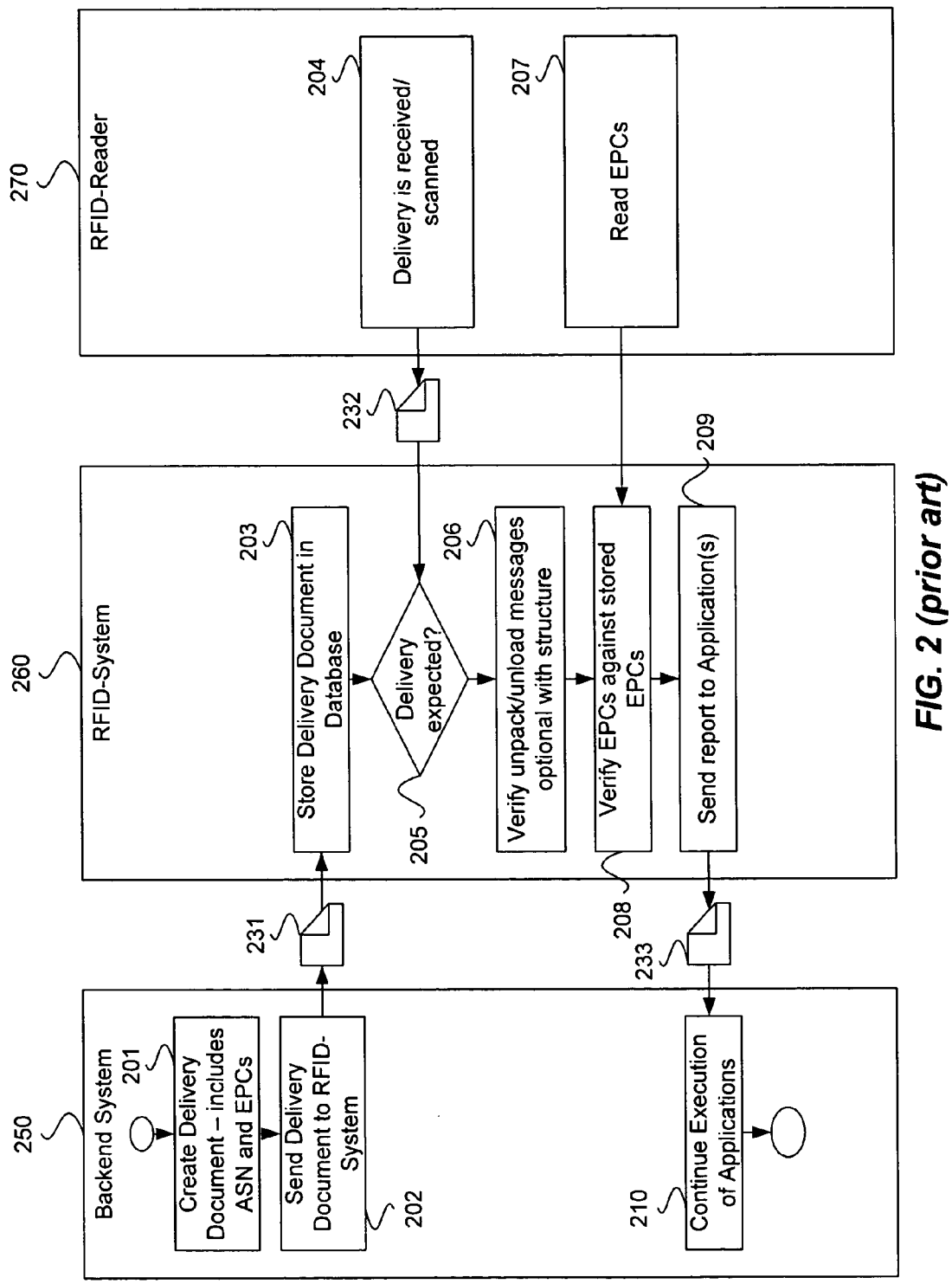
FIG. 2 illustrates an example use of an auto-ID system.
Figure 3:
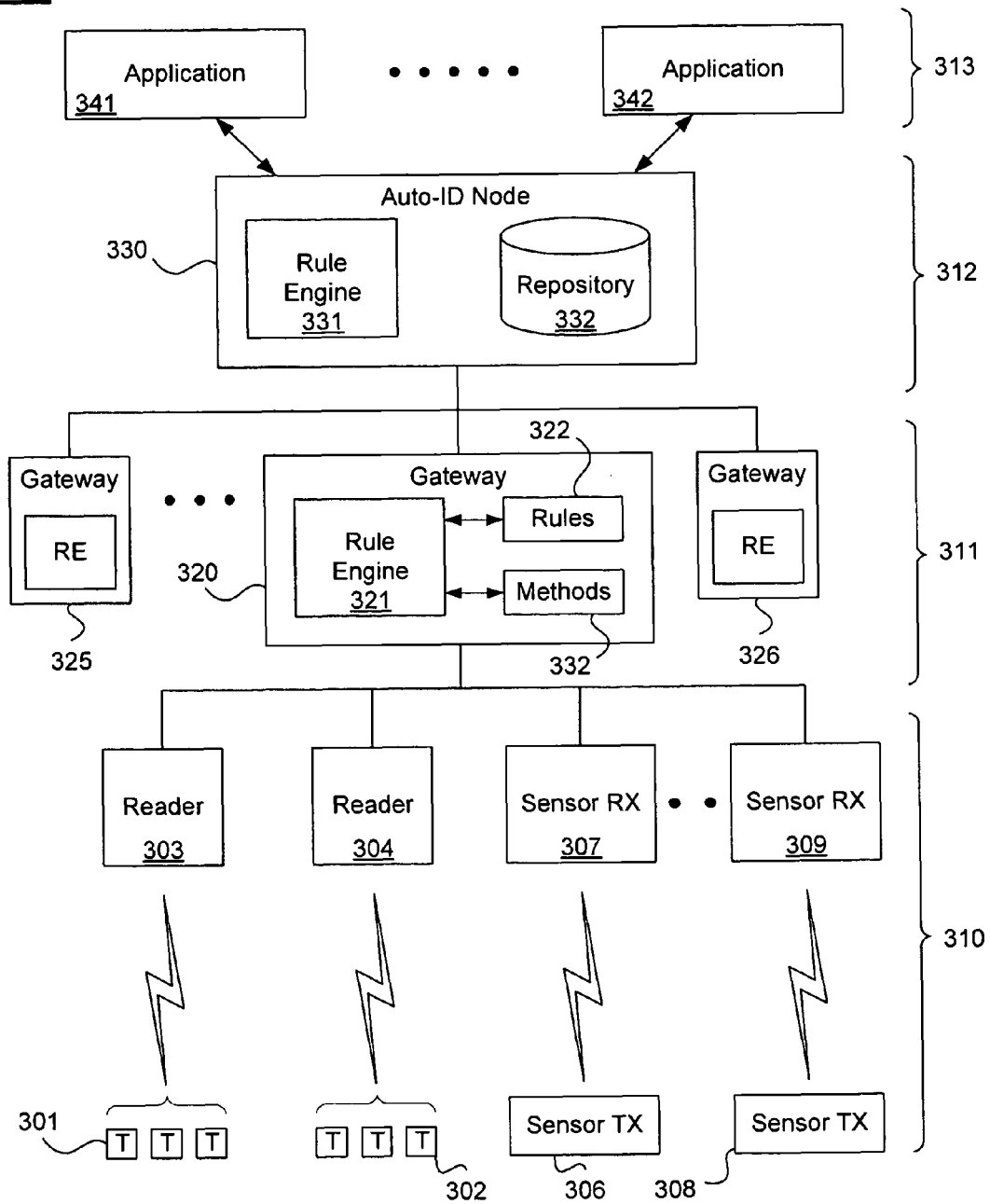
FIG. 3 illustrates an auto-ID system according to one embodiment of the present invention.

FIG. 3 illustrates an auto-ID system 300 according to one embodiment of the present invention. Auto-ID system 300 includes a device layer where auto-ID data is stored and/or generated, a gateway layer 311 for processing the data according to a first set of rules, an auto-ID node layer 312 for processing data according to a second set of rules, and an application layer 313 for executing applications that use the auto-ID data. One or more applications may be coupled to one or more auto-ID nodes, and each auto-ID node may be coupled to one or more gateways. Each gateway, in turn, may be coupled to one or more auto-ID devices. Accordingly, auto-ID data generated by the device layer may be received at an input of a gateway 320, processed according to the first set of rules, and provided on an output to one or more auto-ID nodes for further processing. Thus, in one embodiment, the present invention includes an intermediate layer (the gateway layer), to offload some auto-ID data processing away from the auto-ID node.

Device layer 310 comprises one or more auto-ID devices that generate auto-ID data such as, for example, RFID tags 301 and 302, RFID readers 303 and 304, sensors 306 and 308, and sensor receivers ("RX") 307 and 309. RFID tags may be active (i.e., with an internal power source) or passive (i.e., without an internal power source). Passive tags are typically powered by receiving an RF signal from an RFID reader and using some of the received signal energy to power the circuits on the tag. One or more tags 301 may receive a read request signal from RFID reader 303, and in response to the read request, tag(s) 301 may transmit RFID data stored in the tag(s) to the reader. Similarly, tag(s) 302 may send RFID data to reader 304. RFID data may include a digital code used to identify an object (i.e., an ID) that the tag may be affixed to or associated with. For example, RFID data may be an electronic product code ("EPC") corresponding to a product that the tag is attached to.

In some applications, the auto-ID data may derive from one or more sensors, which may be configured in a network, for example. As illustrated in FIG. 3, a sensor 306 may sense a parameter such as temperature, light, sound, acceleration, orientation, or humidity, for example. In one embodiment, the system includes a wireless sensor transmitter ("Sensor TX") and a sensor receiver ("Sensor RX"), and data generated by the sensor may be stored locally and/or transmitted from the sensing device to the receiver wirelessly.

RFID readers and sensor receivers are coupled to an input of gateway 320. Gateway 320 receives the auto-ID data on an input and processes the data. Gateway 320 includes a rule engine 321, rules 322, and methods 332. A rule engine is a software program that processes data according to a plurality of predefined rules. Rules 322 may be stored on the gateway 320, for example. The gateway software may also include a plurality of methods that are available for execution. Methods may perform operations and/or process data, and are sometimes referred to as procedures or functions. As described in more detail below, rules may be used to specify particular processing methods in the plurality of available processing methods that are used during processing.

An output of gateway 320 is coupled to auto-ID node 330. Auto-ID node 330 includes a rule engine 331 and repository 332. Rule engine 331 may interact with both applications in the application layer and with gateways in the gateway layer. Rule engine 331 in auto-ID node 330 may perform a second level of processing. Data used by rule-engine 331 may be stored in a repository 332, such as a database. Rule engine 331 may, for example, include business logic that requires some, all, or none of the auto-ID data. Rule engine 331 may handle complex or computationally intensive processing tasks, whereas gateway 320 may handle less complex processing or preprocessing of raw observation data as illustrated by the examples below.

Figure 4:
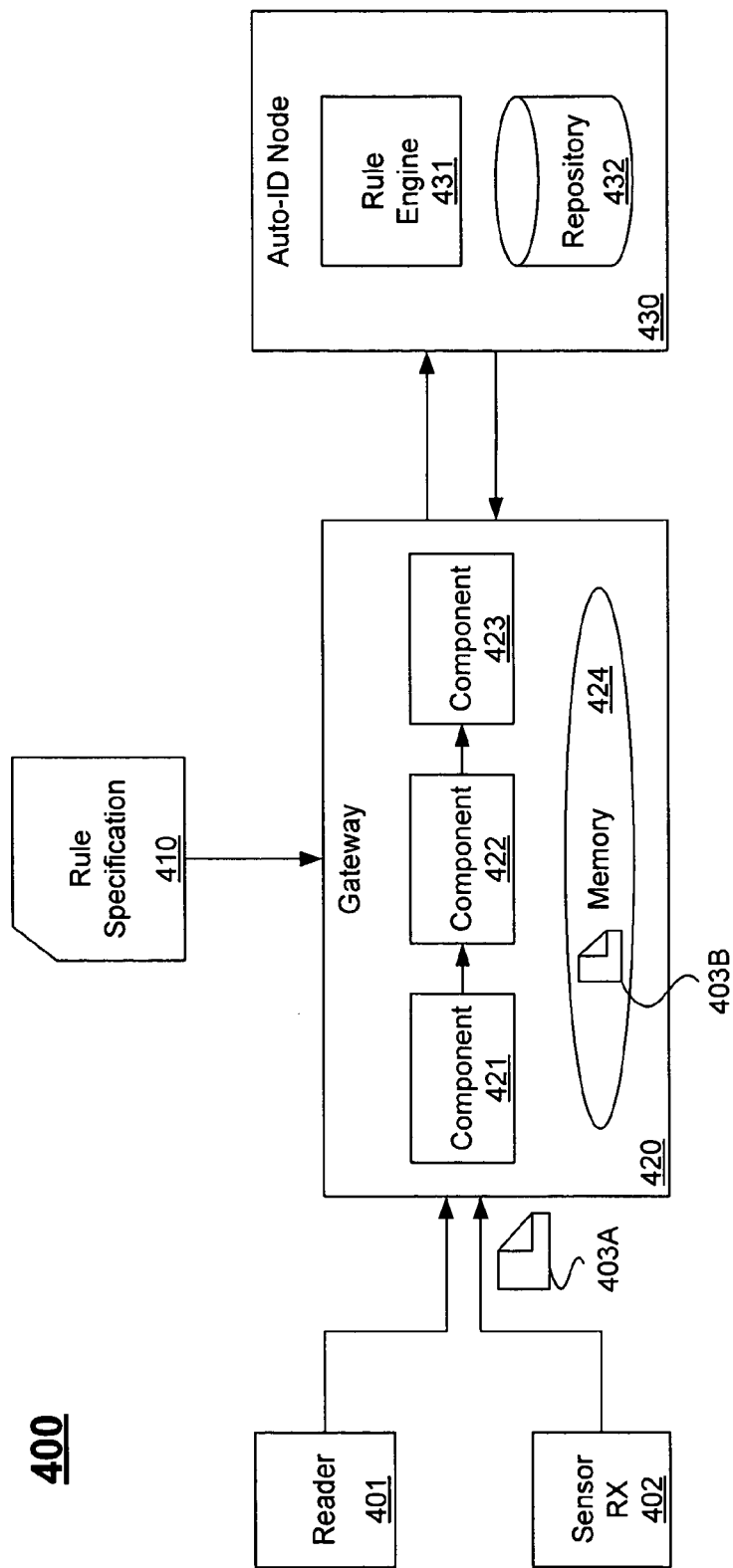
FIG. 4 illustrates a computer system including a gateway according to one embodiment of the present invention.

FIG. 4 illustrates a computer system 400 including a gateway according to one embodiment of the present invention. In one embodiment, the present invention includes a componentized gateway architecture that receives and processes data from auto-ID devices using components that are derived from predefined rules. The gateway may send and receive the data, results, or transactions with an auto-ID node. For example, reader 401 and sensor receiver 402 may send auto-ID data 403A to gateway 420. In one embodiment, auto-ID data may be sent to gateway 420 as an auto-ID event. Auto-ID data 403A may be copied or moved into memory 424 on gateway 420 as shown at 403B. Data or events may be stored in component buffers or general access buffers, for example, to maintain a history of events over a time period. Gateway 420 may be configured to process the incoming data based on predefined rules. For example, in one embodiment, gateway 420 receives a rule specification 410 that specifies one or more rules. The rules define how data is to be processed as it is received by the gateway. The rules may be used to trigger corresponding software components 421-423 that are executed to implement the rules. Example software components include objects that are instantiated from corresponding class definitions, which may be implemented in a programming language such as C++ or Java. Particular objects may be instantiated based on the predefined rules, and may perform operations (e.g., on the raw auto-ID data), transactions with other systems (e.g., the reader, sensors, or auto-ID node), or execute algorithms, for example. Gateway 420 and auto-ID node 430 may, for example, work together to process auto-ID data. For example, gateway 420 may execute rules that include receiving auto-ID data, accessing the repository 432 in auto-ID node 430, and use the received data to access and retrieve other data for processing the gateway. Additionally, one or more components 421-423 may receive inputs from or provide inputs to rule engine 431 so that the gateway 420 and auto-ID node can work together to process incoming auto-ID data.

Figure 5A:
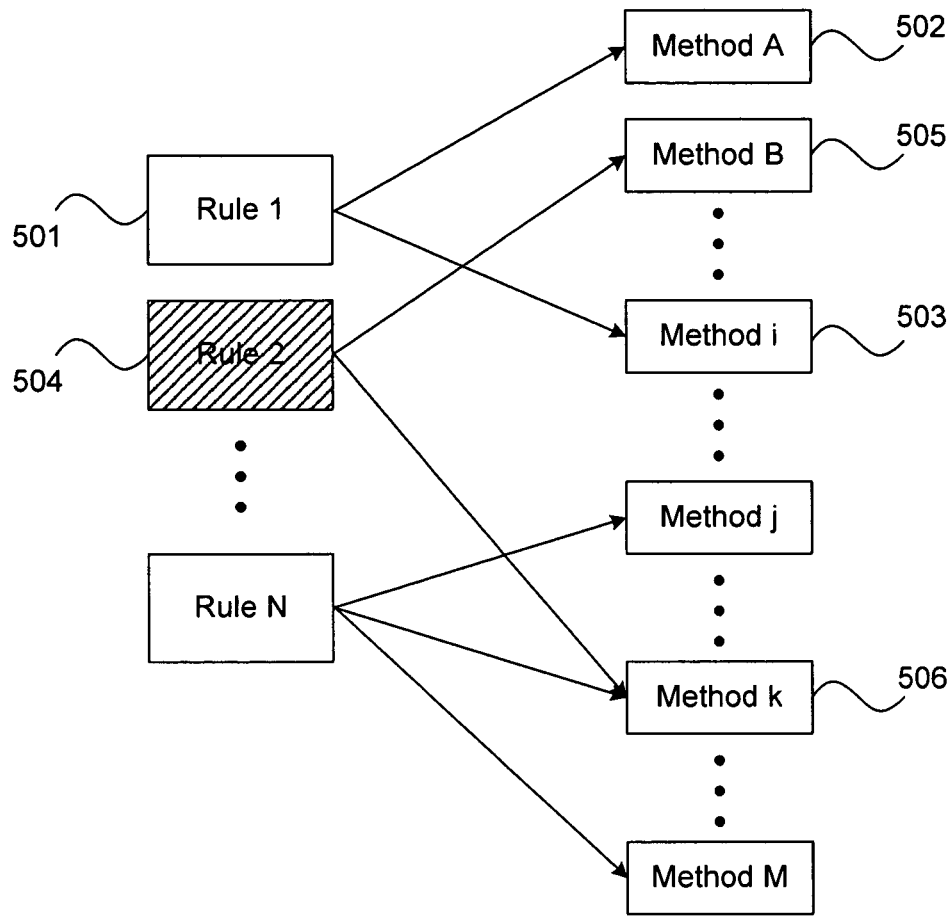
FIGS. 5A-B illustrate rules and methods for processing data according to another embodiment of the present invention.
Figure 5B:
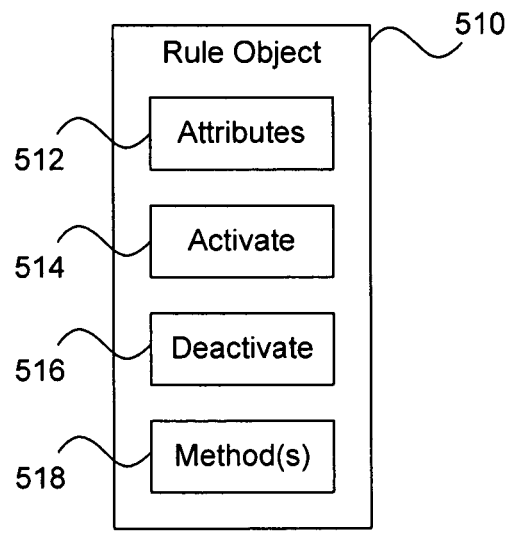

FIGS. 5A-B illustrate rules and methods for processing data according to another embodiment of the present invention. In one embodiment, rules may be activated or deactivated. FIG. 5A illustrates N Rules and M Methods (where M and N are integers). Rule 1 501 may use Method A 502 and Method i 503. Similarly, Rule 2 504 may use Method B 505 and method k 506. Rules may be either in an active or inactive state. In this example, Rule 1 is in an active state and Rule 2 is inactive (as shown by the hashed line pattern). In one embodiment, a rule may be activated or deactivated using a method. FIG. 5B illustrates a rule object. Rule object 510 may include attributes 512, an activate method 514, a deactivate method 516, and one or more other methods 518. When the activate method is executed, the corresponding rule becomes active, and the rule's corresponding methods may be invoked. When the deactivate method is executed, the corresponding rule becomes inactive.

Figure 6:
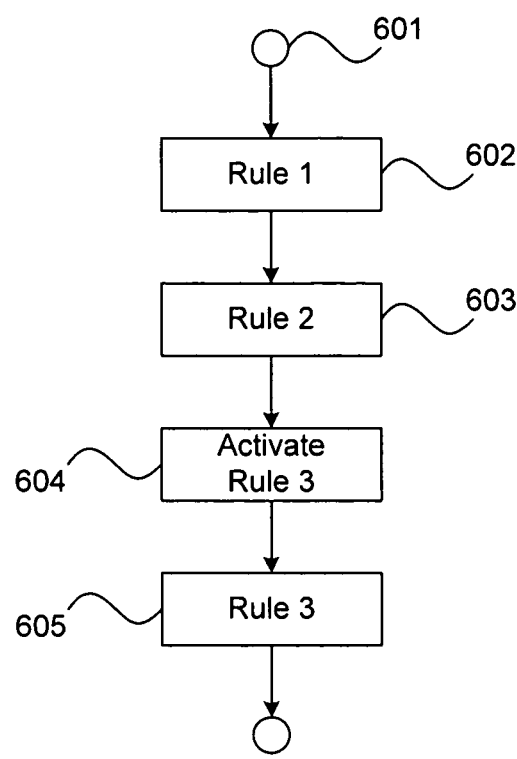
FIG. 6 illustrates another aspect of the present invention.

FIG. 6 illustrates another aspect of the present invention. One aspect of the invention provides a method of processing data using rules that are activated and deactivated automatically by other rules at run-time. First, the system may store a plurality of predefined rules. Each predefined rule may have one or more corresponding particular processing methods in a plurality of available processing methods. Initially, a portion of the plurality of predefined rules are in an activated state and another portion of the plurality of predefined rules are in an inactivated state. One or more of the activated rules may have a corresponding method activated. During run-time, the execution of a method corresponding to an activated rule may cause another inactive rule to become activated or cause an active rule to become inactive. For example, a rule engine may invoke active Rule 1 at 602 after some other step 601. Rule 1 may cause active Rule 2 to be invoked at 603. The next step in the process may involve invoking Rule 3 604, which may be invoked as part of a process flow definition or in accordance with the execution of another rule (e.g., Rule 2). However, Rule 3 is in an inactive state. Thus, according to one aspect of the present invention, inactive rules may be used to process data by a rule engine by automatically activating the rules at run-time. Rules may similarly be automatically deactivated. By deactivating one or more rules, and then automatically activating them based on other rules, the system overhead is reduced and fewer resources are consumed.

Figure 7:
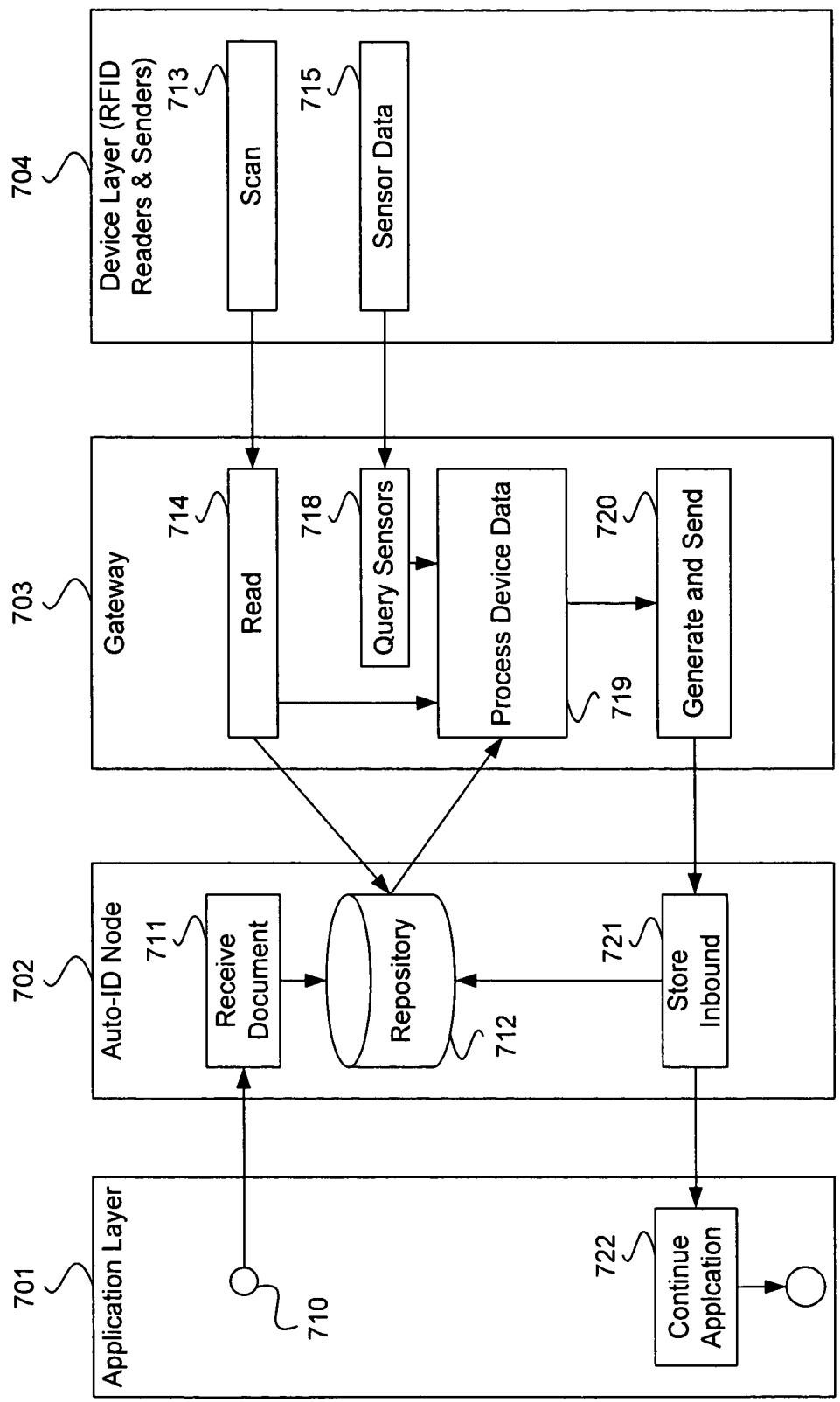
FIG. 7 illustrates an example application according to one embodiment of the present invention.

FIG. 7 illustrates an example use case according to one embodiment of the present invention. FIG. 7 shows an application layer 701, auto-ID node 702 (or "business process bridging layer"), gateway 703, and device layer 704. An application that uses auto-ID features may be executing at 710. For example, at 710 a document may be created and the application may want to use the auto-ID data to process the document. First, the document is sent to the auto-ID node. At 711 the document is received by the auto-ID node. At 712, the document is stored in a repository on the auto-ID node. At 713 RFID readers may scan for tags and receive RFID data. At 714, the RFID data may be read into the gateway. The gateway may, in turn, send the received RFID data to the auto-ID node and used to retrieve information associated with the RFID data. For example, if the RFID data is EPC codes, and the document is a shipping invoice with EPC line items, the EPC codes can be used to retrieve all shipping invoices from the auto-ID node with associated EPC codes. Accordingly, the auto-ID node may send the associated information, such as the stored document, to the gateway. In one embodiment, the gateway generates a query, such as a SQL query, or request, such as a remote function call, using the RFID data. The query may be sent to a database on the auto-ID node to retrieve associated information in the database and automatically send the information back to the gateway. At 715, sensor data may be read from the sensors. For example, a signal may be generated to query the sensors for parameters at 718. As describe in more detail below, sensors may automatically and periodically store sensed parameters locally (e.g., periodically powering on; taking a measurement; storing the result in a nonvolatile memory; and then powering off). When a sensor receives a query from the gateway, the sensor may send all of the stored data to the gateway.

In another embodiment, the auto-ID data is received in the gateway from one auto-ID source and used to retrieve data from another auto-ID source. For example, the auto-ID data from one source (e.g., an RFID reader/tag) may be used to determine whether or not auto-ID data from another source (e.g., a sensor) should be retrieved. One illustrative example is supply chain management ("SCM"). In this particular application, a document may be received from a SCM application and stored on the auto-ID node. The document may indicate that RFID data, such as EPC codes, are attached to shipped items that also include sensors. For example, an RFID tag and temperature sensor may be attached to a wine shipment, and an advanced shipping notice ("ASN") generated by the SCM application and sent to an auto-ID node may include an association between the RFID tag data and expected sensor data, which for example provides information about the shipping conditions. Accordingly, when the gateway receives the RFID tag data, the associated ASN indicates that sensor data is also expected. The gateway is then triggered to query the sensors and retrieve the data.

Auto-ID data may be processed according to predefined rules in the gateway software at 719. The gateway software may receive the RFID data, the sensor data, and additional information associated with either auto-ID data or other data specified by rules that have been defined. At 720, outputs such as transactions, results, or even auto-ID data may be generated and sent from the gateway to the auto-ID node. At 721, auto-ID node may store inbound information from the gateway. Auto-ID node 702 may perform additional local processing, if necessary, and then continue the application at 722.

EXAMPLE IMPLEMENTATION

Figure 8:
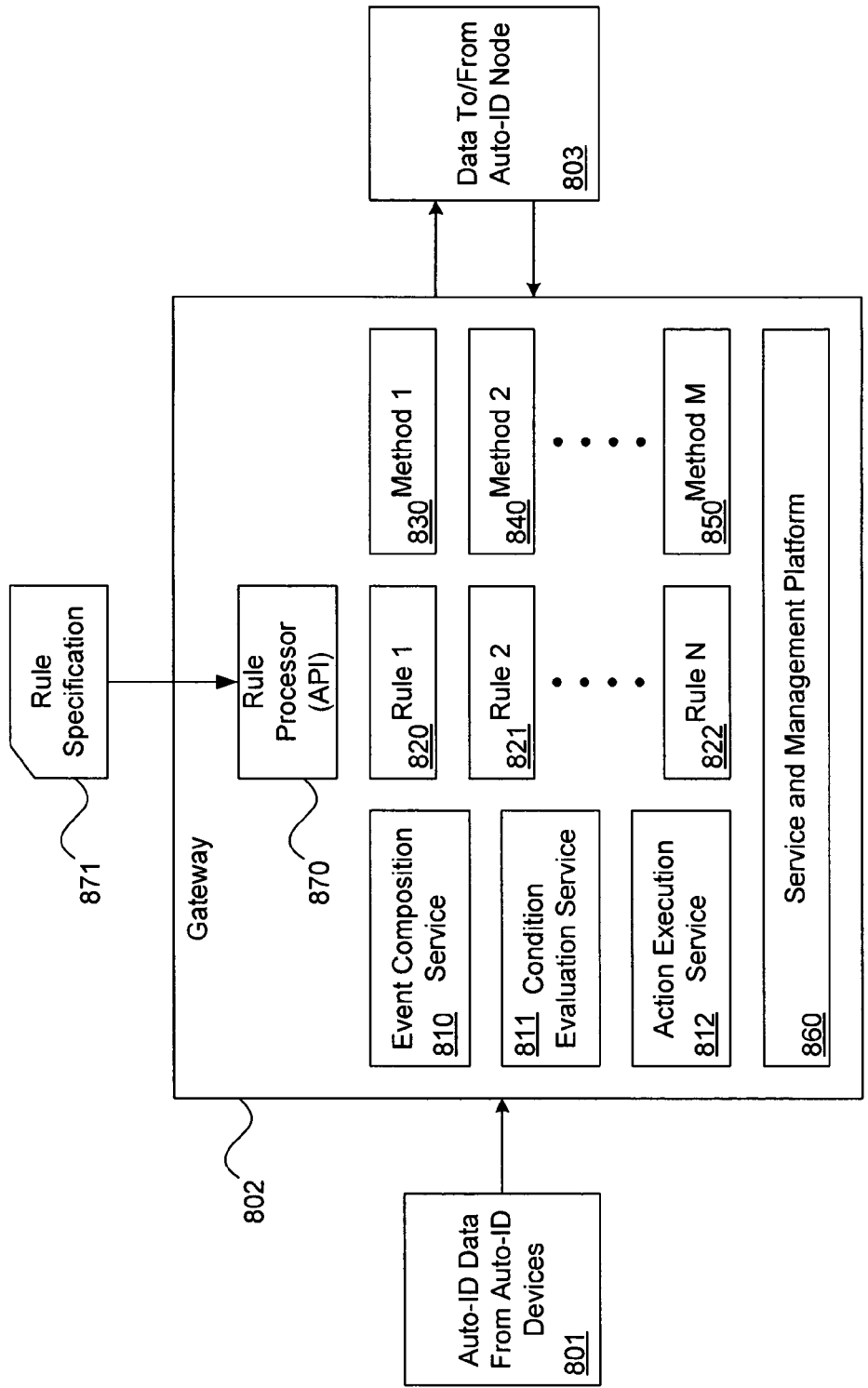
FIG. 8 illustrates an example implementation of a rule processor on a gateway according to one embodiment of the present invention.

FIG. 8 illustrates an example implementation of a rule processor at the gateway layer according to one embodiment of the present invention. The rule processor depicted in FIG. 8 is an example of an event, condition, action ("ECA") rule processor. The rule processor offers the functionality needed to define, remove, activate/deactivate, and search/browse ECA-rules. Gateway 802 includes an event composition service 810, condition evaluation service 811, and action execution service 812, which are described in more detail in FIG. 9. These services control the execution of methods specified by the rules stored on the gateway. Gateway 802 further includes N rules 820-822 and M available methods 830, 840, and 850. A service and management platform 860 is included for managing execution control and overhead, for example. The service platform may be implemented using OSGi, for example, and may provide life-cycle management, remote deployment, and service dependency control.

Rule processor 870 may expose an application program interface ("API") for receiving a rule specification 871 for adding new rules in the gateway. Rule processor 870 may include a parser, for example, for parsing a text based rule specification and generating one or more rule objects for processing the auto-ID data. As described in more detail below, rules may be loaded on the gateway by providing a specification of the rule. The specifications may be converted into a local rule representation (e.g., rule objects) that access particular methods. Each rule may be active or inactive. In some embodiments, active rules cause inactive rules to become active or cause active rules to become inactive. In an ECA rule processor, data or events may flow through the event composition service, condition evaluation service, and/ or action execution service, and active rules may be invoked by one or more of these services. Accordingly, in some embodiments a rule specification may include an event specification part, a condition evaluation part, and an action part.

Figure 9:
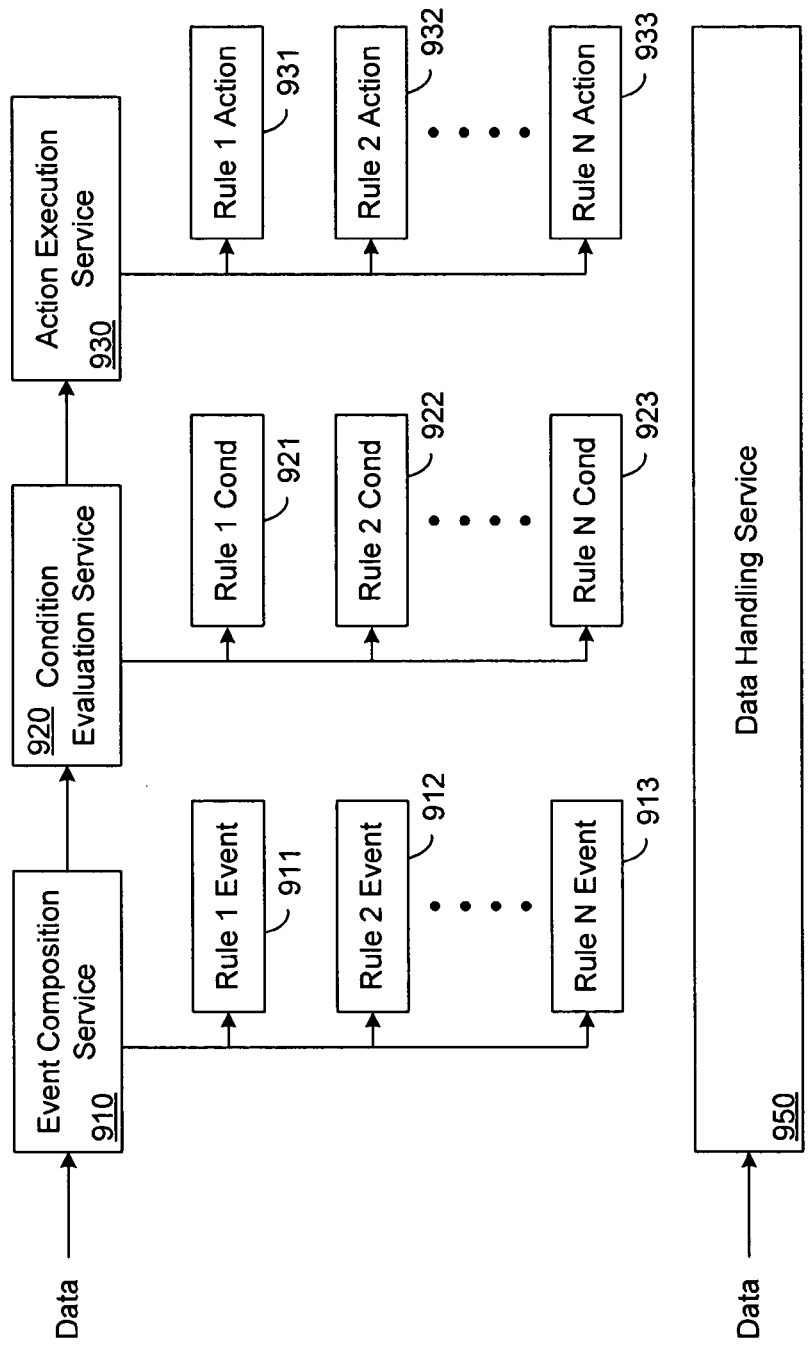
FIG. 9 illustrates the operation of a rule processor on a gateway according to one embodiment of the present invention.

FIG. 9 illustrates the operation of a rule processor on a gateway according to one embodiment of the present invention. Incoming auto-ID data is received by an event composition service 910. In some applications, auto-ID data may first be packaged by an event notification service (not shown) and received in the rule processor as an auto-ID event that includes the raw auto-ID data and other information such as a time stamp, data type, or source identifier, for example. The event composition service 910 detects particular types of events. Event service 910 may apply event rules to either detect simple or complex events. A simple event may be detection of a particular attribute, for example, such as detecting the reception of an EPC code. A complex event may be defined by a rule which may include logical combinations of events using logic functions such as AND, OR, or NOT to create compound events. Detecting compound events gives the rule engine more flexibility to perform more complex algorithms or process flows at the gateway layer. In some embodiments, the complex event detection service may combine other services which are required for event detection, such as a filtering service, time service, alarm service, event adapters. Once an event is detected, the simple or complex event is received by the condition evaluation service 920. Condition evaluation service 920 may apply conditional expression rules to the event and execute predefined methods if the conditions are satisfied. Next, an action execution service 930 may receive the event and apply the methods specified by the rule actions (i.e., the actions determined by the rules).

In this example, each service may access corresponding rules to perform their functions. For example, event service 910 may use N rule events 911-913 (i.e., the events that trigger the evaluation of a rule). Rule 1 may specify an event, a condition, and an action. Thus, Rule 1 Event 911 may detect an event specified by Rule 1. Other events may be detected by Rule 2 Event 912 or any number of other event detection rules. The condition service 920 may use rules 921-923 to evaluate condition expressions and perform operations if the conditions are satisfied. Rule 1 Condition 921 may receive an event and use one or more attributes of the event as inputs to a condition expression. If the condition is satisfied, then methods associated with Rule 1 condition may be executed. Finally, the action execution service 930 may use rules 931-933 to perform various actions specified by the rules.

Events may flow between services 910, 920, and 930 in a variety of ways. In one embodiment, data may be passed directly between services. For example, the services may pass data or events using asynchronous function calls between the services. Data or events may be passed between each service for processing by corresponding rules, or the data may be stored in memory with pointers to the data to be used for data access and flow. In another embodiment, a data handling service 950 (e.g., an event broker) receives the data, and the services and corresponding rules subscribe to the data handling service. Event, condition and action services may be combined using a publish/subscribe (pub/sub) notification service, which transports event information among them. Producers make information available by publishing it, while consumers place a standing request for events by issuing a subscription. Thus, when data or events are received, the data handling service may publish the received data or events. In one embodiment, each service 910, 920, and 930 may expose two kinds of generic and very simple interfaces: i) a service interface with a single method that receives an event notification as an argument; and ii) a configuration interface that is used for administration purposes, such as registration, activation, deactivation, of rules with each service. As mentioned above, in one embodiment rules may be active or inactive, and active rules may activate or deactivate other rules.

Figure 10:
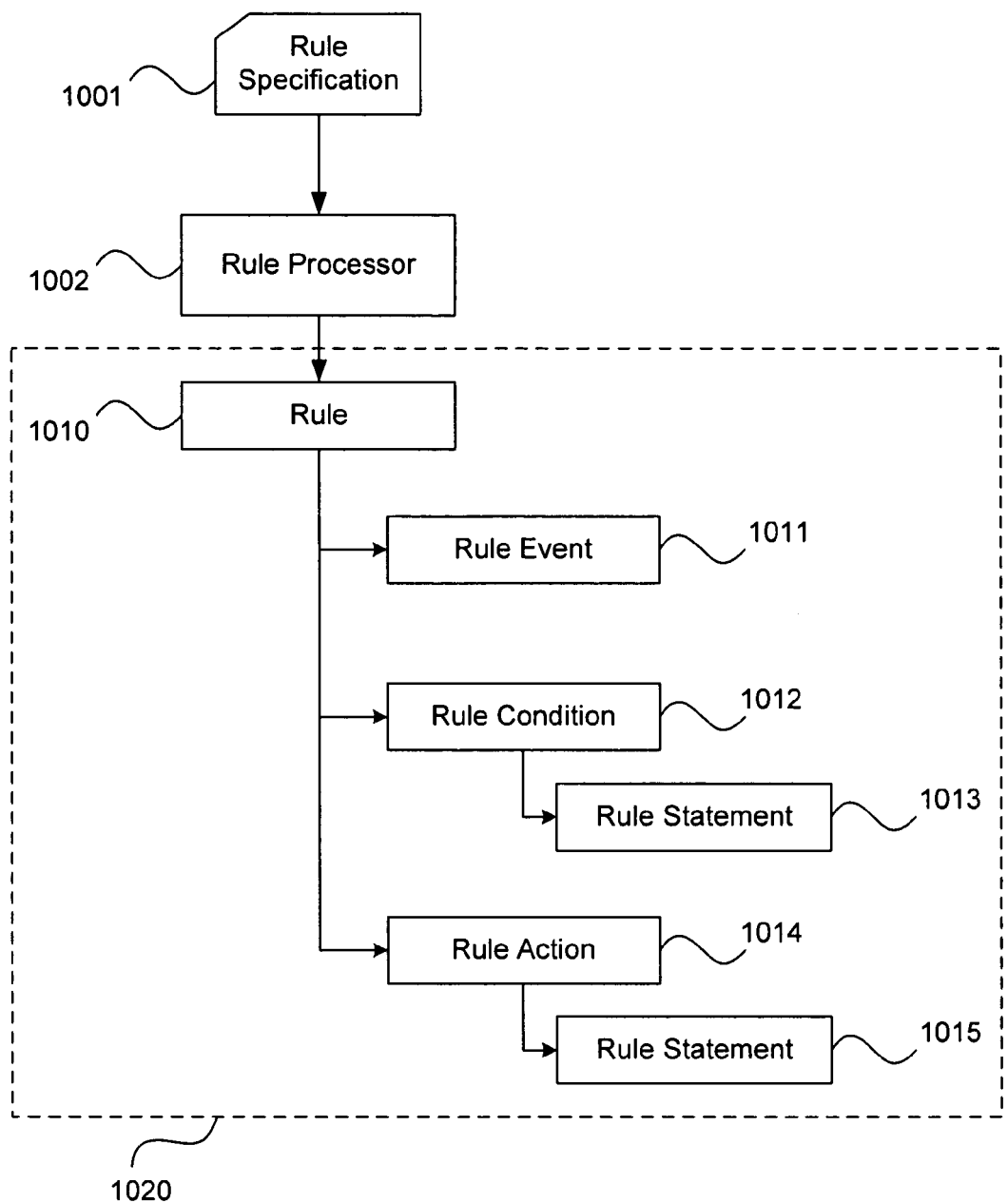
FIG. 10 illustrates an example of registering a new rules specification.

FIG. 10 illustrates an example of registering a new rule specification. In this example, a rule specification 1001 is received by rule processor 1002. An example of a rule specification is shown in the APPENDIX below. From the example, it can be seen that the rule specification may be represented in XML. As mentioned above, rule processor 1002 may include a parser for parsing text based rule specifications, such as XML. In this example, rule processor 1002 parses rule specification 1001 and creates rule objects (e.g., in an object-oriented language such as Java or C++). Rule processor 1002 may include API's for deploying a rule (i.e., translating the specification into an object), activating a rule, deactivating a rule, or browsing rules, for example. An illustrative rule object is shown at 1020. The gateway rule engine may implement ECA rules as Java objects, for example. This representation can be obtained from different sources like an XML document or plain text files, depending on the respective implementation of the rule processor and also depending on the domain in question. In an Event-Condition-Action processor, each rule may include a base rule part 1010, a rule event part 1011, a rule condition part 1012, and a rule action part 1014. The rule condition 1012 and rule action 1014 parts may further include rule statements 1013 and 1015 for implementing actions through associated methods.

Figure 11:
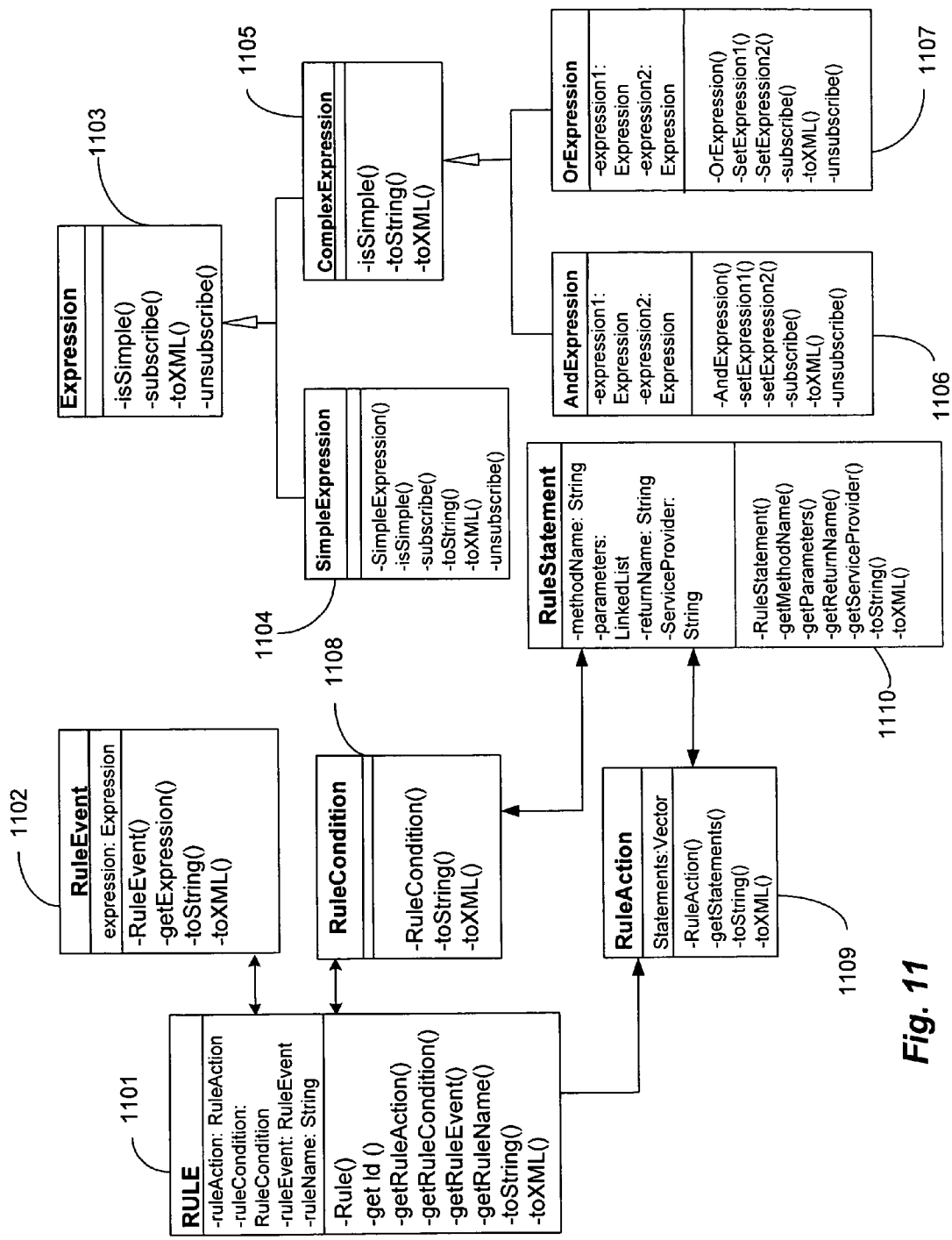
FIG. 11 illustrates a class hierarchy for an example rule implementation.

FIG. 11 illustrates a class hierarchy for an example rule implementation. In this example, Rule 1101 is a base class, RuleEvent 1102 is a derived class, which calls Expression 1103, SimpleExpression 1104, and ComplexExpression 1105 to implement predefined event rules. ComplexExpression 1105 includes ANDExpression 1106 andORExpression 1107 derived classes for implementing logical combinations of data or events received by the rule engine. Similarly, RuleCondition 1108 implements condition expressions (e.g., the method "RuleConditionon( )"), and may call RuleStatement 1110 to perform operations if the conditions are satisfied. RuleAction 1109 implements actions by calling RuleStatement 1110. If a rule is active, it may be associated with one of the ECA services described above. Additionally, in one embodiment, each rule may include methods that, in some cases, may activate an inactive rule or deactivate an active rule as described above.

Once a rule is deployed and the object representation of the rule is obtained, it can be activated or deactivated. The rule can be made active by calling an "activate" method. The rule processor may also provide the inverse methods to deactivate rules, as well as rule search/browse methods as mentioned above. This mechanism may be used to deactivate a partial set of rules without un-deploying them. Additionally, a debugging method can be added to allow detailed analysis of the execution of rules. This feature could be exploited to view the execution of rules on a management console, for example.

Figure 12:
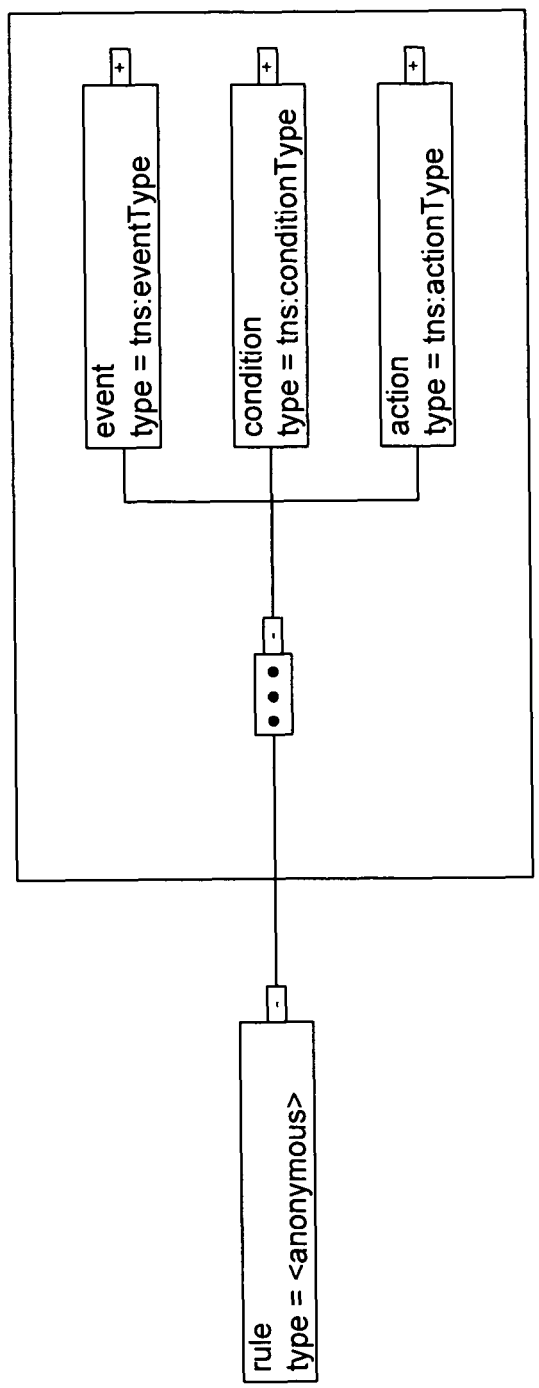
FIGS. 12-15 illustrate the grammar of a rule specification according to one embodiment of the present invention.
Figure 13:
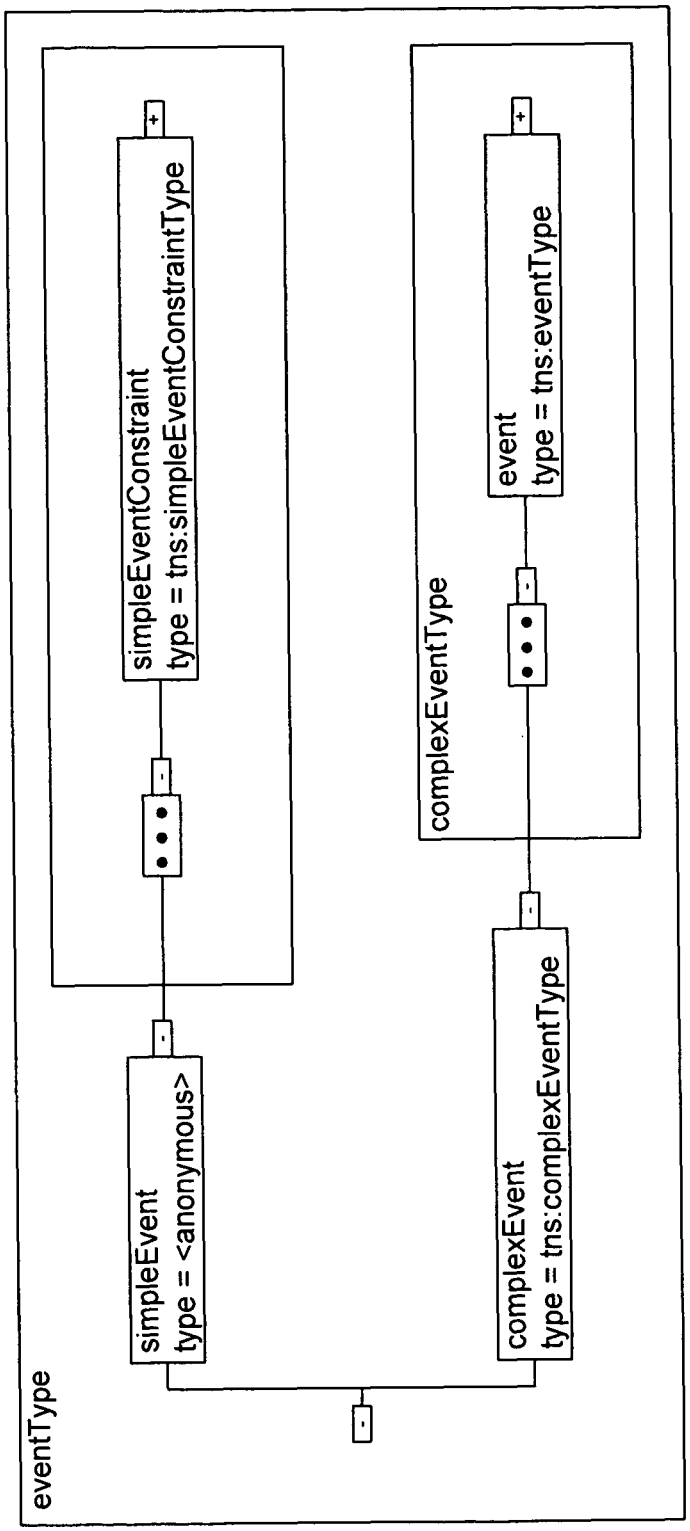
Figure 14:
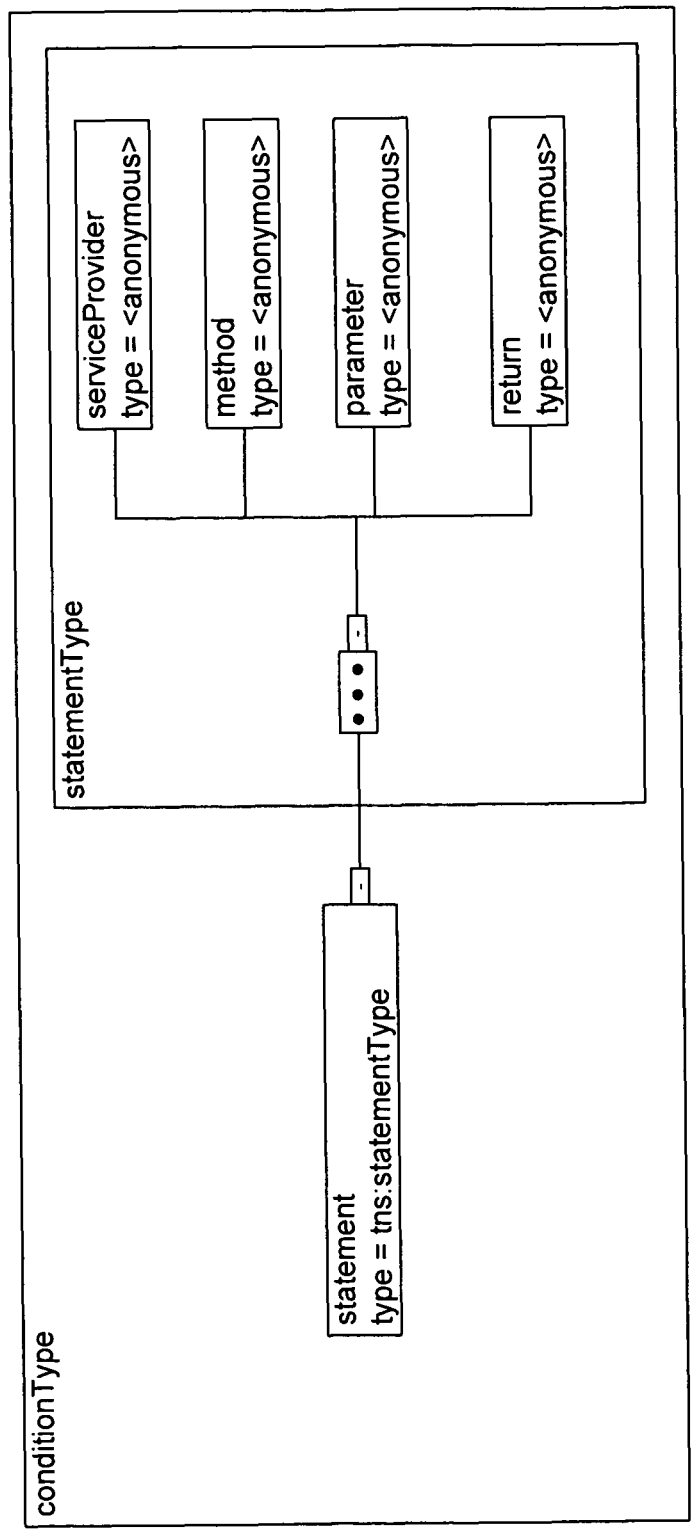
Figure 15:
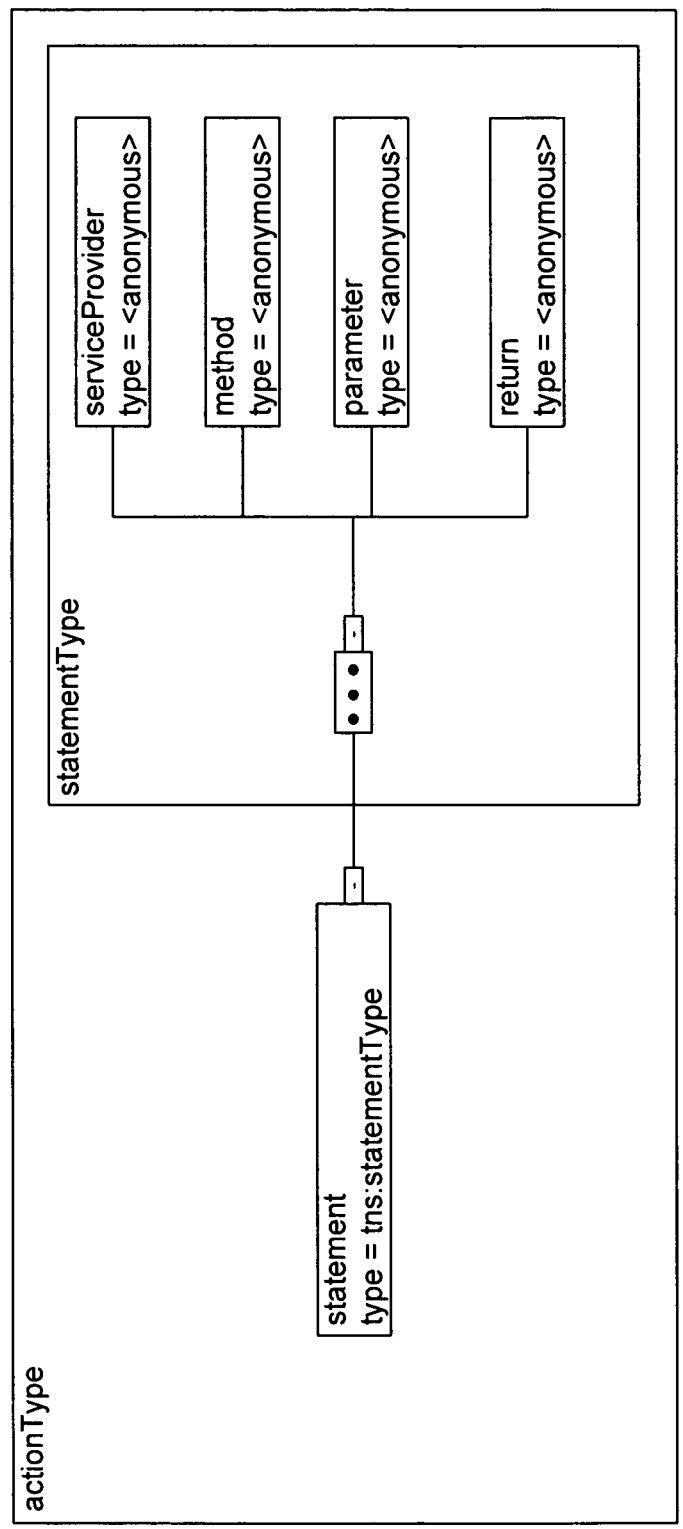

FIGS. 12-15 illustrate an example grammar of a possible rule specification language according to one embodiment of the present invention. FIGS. 12-15 illustrate the grammar of a rule as a diagram. Constructs in this example grammer may include types such as an XML namespace or an anonomous type that may used as placeholder, for example. As mentioned before, an ECA rule may include an event part, condition part, and action part as shown in FIG. 12. The event part may include an expression that specifies "when" an ECA rule should be triggered. The event could be "simple" (i.e., defined with a primitive event), or "complex" (i.e., composed by OR/AND constructs—e.g., recursively). The schema for an event part of a rule is shown in FIG. 13. Simple events are illustrated in this diagram as comprising one or more simple event constraints for specifying a simple event to be detected. Complex events are illustrated in the diagram as comprising one or more complex event definitions for specifying combinations of events to be detected. The condition part is illustrated in FIG. 14. The condition part may be used to specify additional constraints to operate an ECA rule, and may not be included in all ECA rules. This part of the rule may include a list of single statements. Conditions are illustrated in the diagram of FIG. 14 one or more statements. A statement may specify the name of the entity that provides the service, the method name, a list of parameters, and an optional return value. Statements used in conditions to evaluate a condition expression will typically return a Boolean value. FIG. 15 illustrates an action. The action part may be structured in a similar way as the condition part. It contains also a list of statements describing the services which should be executed in the defined order. Actions are illustrated in the diagram of FIG. 15 as one or more statements, which specify a service provider, a method, parameters, and return values.

Figure 16:
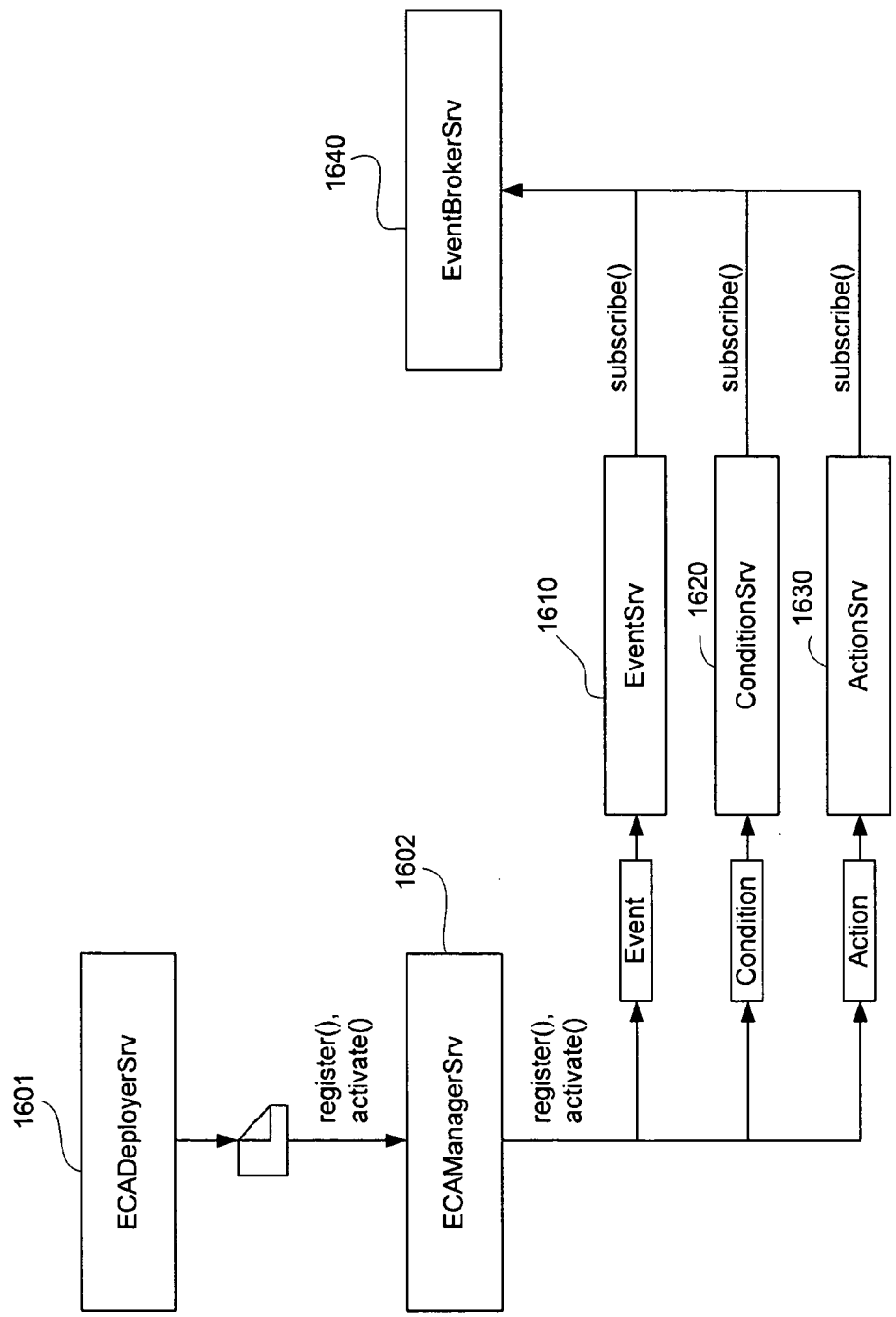
FIG. 16 illustrates and example deployment of a rule on a gateway.

FIG. 16 illustrates an example deployment of a rule on a gateway. As mentioned above, rules may be deployed by contacting a rule processor API. In one embodiment, a proxy of this API may be used. The proxy may be responsible for converting the rule representation (e.g., an XML document using the schema described above) into Java objects. The objects may be serialized and then moved to a specific directory where the rule processor is running (e.g., on the gateway). In this example, the rule processor includes an ECADeployerSrv 1601 that periodically checks a directory's XML files describing rules. Whenever an XML file is added, the rule contained in it is parsed to obtain the Java object representation. With it, an ECAManagerSrv 1602 is contacted and both the register and activate methods are invoked, and the rules event, condition, and action parts are provided to the event service 1610, condition service 1620, and action service 1630. Active rules may also subscribe to an event broker service 1640 to receive published events, for example.

Registration of a rule may involve integrating the rule into the ECA services. This process may include: i) decomposing the rule; ii) finding; iii) contacting; and iv) configuring the ECA services to support the rule. An ECA-rule manager decomposes the rule definition passed for registration, and based on its parts it finds necessary services in the service registry. The ECA-rule manager may also be responsible for building a chain of services that will process the rule in question. ECA services may then be contacted for configuration. The configuration of an ECA service itself may include three steps: a) the subscription to the output of the preceding ECA service, b) the configuration of the task under the responsibility of this service (e.g. a condition evaluation service is configured with the condition of the rule that must be evaluated) and c) the configuration of the publisher.

Figure 17:
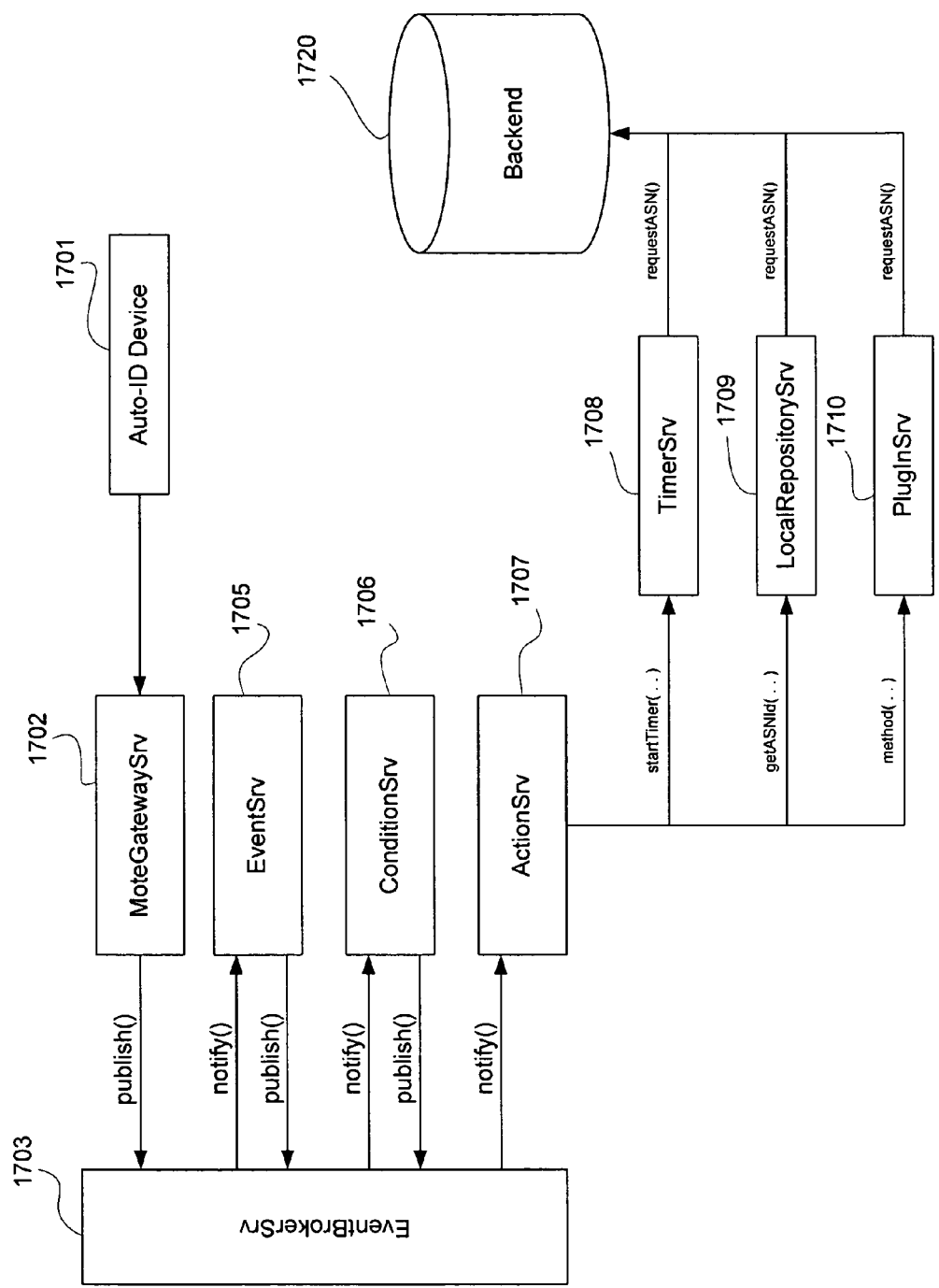
FIG. 17 illustrates an example run-time process of a rule engine on a gateway.

FIG. 17 illustrates an example run-time process of a rule engine on a gateway. FIG. 17 shows an example of data and execution flow to illustrate example components involved in the processing of an auto-ID read event. First, auto-ID device 1701 reads a tag. The auto-ID device prepares an active message (e.g., using TinyOS) containing the event information (EPC value, door number, timestamp, etc.), and may send the packet to the gateway (e.g., through the radio). A MoteGatewaySrv 1702, which runs in the gateway, receives the incoming radio packet. The information may be wrapped as an 'EPC' event. Service 1702 publishes the event in the EventBrokerSrv 1703, for example. An EventSrv 1704 is notified if there are predefined rules interested in such an event. If the rule expression is satisfied, the EventSrv 1704 may republish the composite event. If no event composition is needed the event composition step may be omitted entirely. If the rule includes a condition part, then the ConditionSrv 1706 is notified. If the conditions are met, then methods associated with the rule are executed and service 1706 republishes the 'EPC' event. Finally, the ActionSrv 1707 is notified, and the rule's particular statements are executed, such as starting a timer using a method call in a timer service 1708, fetching information from backend database 1720 using a method call in a local repository service 1709, or by invoking methods in any plug-in services that are available in the system, for example.

Figure 18:
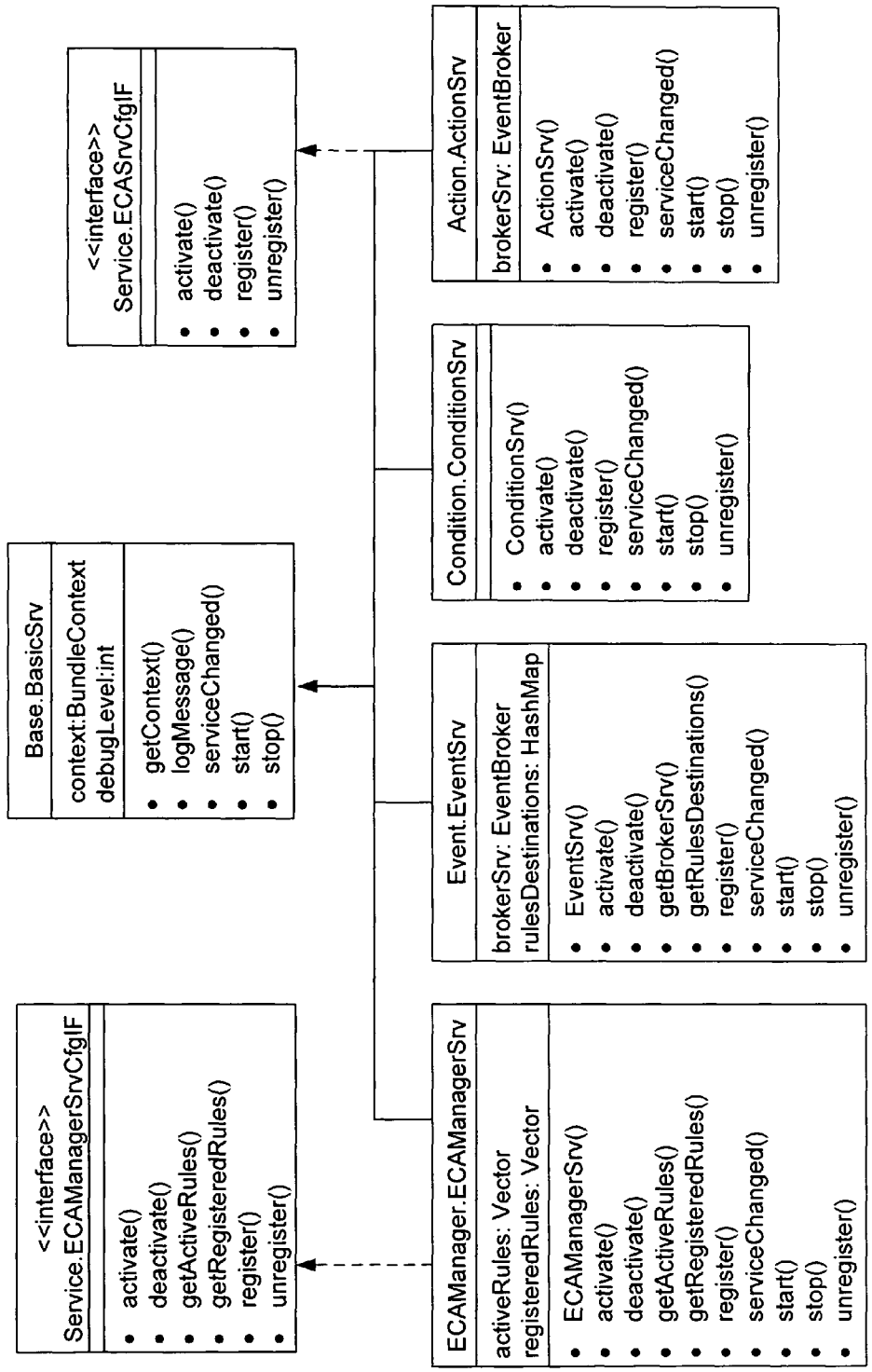
FIGS. 18-19 illustrates classes that may be used in an example implementation of one embodiment of the present invention.
Figure 19:
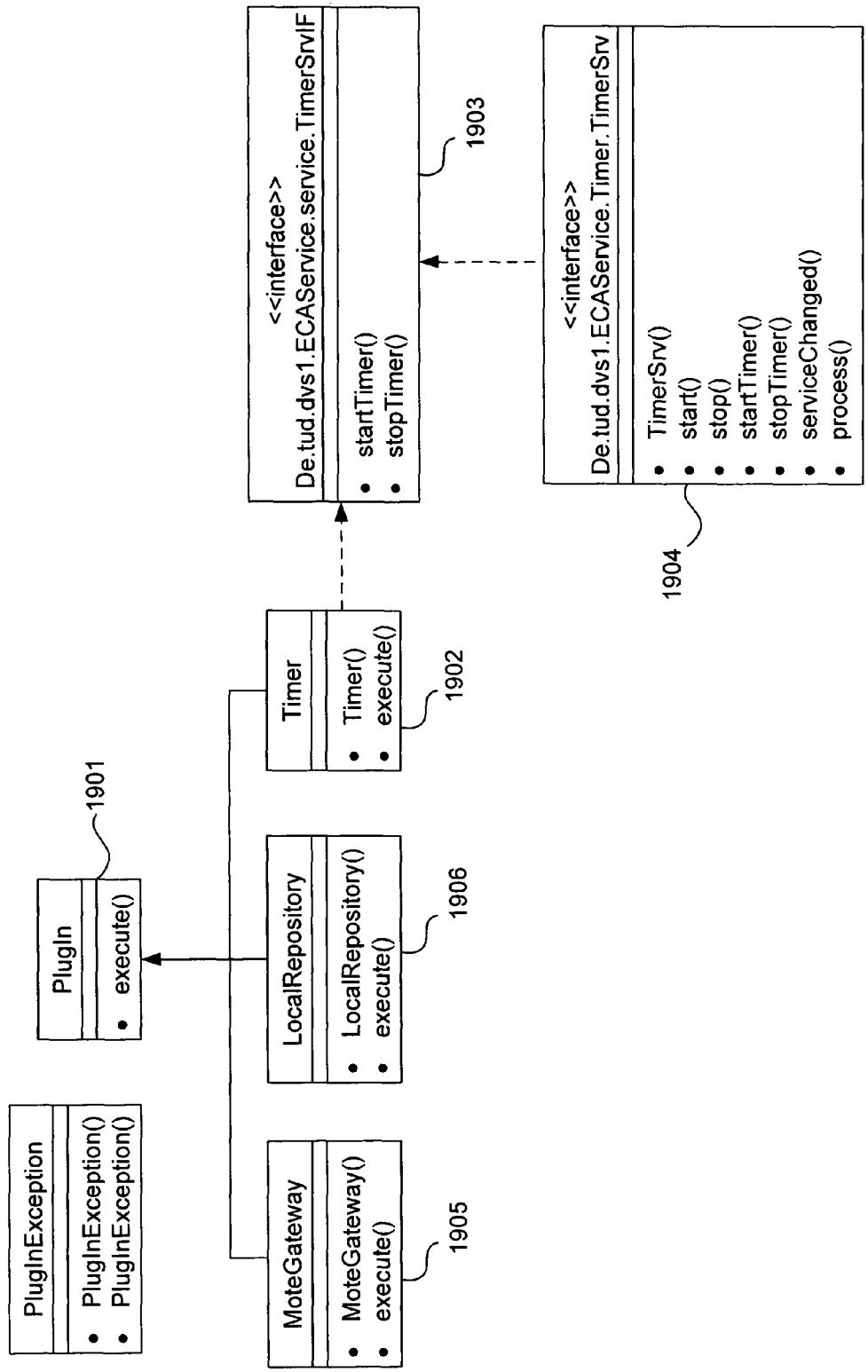

FIGS. 18-19 illustrates classes that may be used in an example implementation. As was previously mentioned, the system may be structured as a set of reusable service components ("services"). Each of these services may be packaged as an OSGi bundle, for example. Services may include ECA services (e.g., EventSrv, ConditionSrv, ActionSrv) managed by an ECA Manager Service (e.g., ECAManagerSrv). Operations may also be implemented as statements that can be used by the ConditionSrv or the ActionSrv when specified by a rule. Examples include timers ("TimerSrv") or auto-ID data acquisition services ("MoteGatewaySrv"). The services may be integrated with the rule engine. Each service may further include other services to fulfill its task. For example, the ECAManagerSrv may use the EventSrv, ConditionSrv and ActionSrv at rule deployment-time in order to register or activate a rule. These services, in turn, may use the EventBrokerSrv to exchange information at run-time. In order to make a service aware of the availability of its required services, a ServiceListener interface may be implemented by a service. Since some functionality is common to all of the ECA services, an abstract BasicSrv class may be implemented. ECA services extend this class, as depicted in FIG. 18.

Additionally, the ECAManagerSrv may implement a configuration interface to configure the services (e.g., ECAManagerSrvCfgIF). This is the interface that an external component can use to deploy (i.e., register/activate) or undeploy (i.e., deactivate/unregister) a rule, or browse registered/active rules. The remaining EventSrv, ConditionSrv and ActionSrv classes implement another configuration interface (e.g. ECASrvCfgIF). This interface, may be internally used by the rule engine to allow the ECAManagerSrv to uniformly access its core components.

As mentioned above, the EventSrv implements the complex event detection functionality. Therefore, whenever the ECAManagerSrv is requested to register a rule with a complex event (e.g., two simple events connected by an AND, an OR or a NOT), it may delegate the event detection to EventSrv service. As a result, the EventSrv service may keep track of past events, and may perform a matching algorithm whenever new events are received. Past events may be temporarily stored in a buffers (e.g., in a component buffer or general access buffer as describe above). In particular, this implementation of the complex event detection functionality may consume the least recently published events (i.e., the events stored in the buffer for the longest period of time) when the matching is performed. Finally, when a complex event is detected, a new, compound event may be published, which is taken by the next ECA service in the chain (i.e., the ConditionSrv or ActionSrv). The ConditionSrv may execute one or many statements in order to check for further conditions before deciding whether or not to proceed. Similarly, the ActionSrv may execute multiple statements.

FIG. 19 illustrates an example implementation of the methods that are used to perform operations. As described before, a rule's condition and action parts may include a list of statements. These statements may be coherently grouped in services and can be uniformly accessed through a plug-in connector interface. The PlugIn interface, in turn, may expose a generic execute( ) method that receives as parameters both a method name and a parameters list. Each service may implement this interface's single method, taking care that required parameters were properly instantiated. If an error occurs at run-time, a PlugInException may be thrown and caught by the corresponding environment. In this example, each of these services includes three elements: (a) a proxy class, implementing the PlugIn interface, (b) a service specific interface, and (c) an actual class implementing the service. This scheme is depicted in FIG. 19 for the TimerSrv. FIG. 19 shows, between others, the plug-in interface 1901, the timer proxy class 1902, which extends the PlugIn interface; the timer service interface 1903 (i.e. TimerSrvIF), and the timer service class (i.e., TimerSrv). Other methods may be similarly implemented, such as methods for accessing auto-ID data 1905 (e.g., sensor data from "MoteGateway") or methods for accessing a repository on the auto-ID node 1906 (e.g., LocalRepository).

Figure 20:
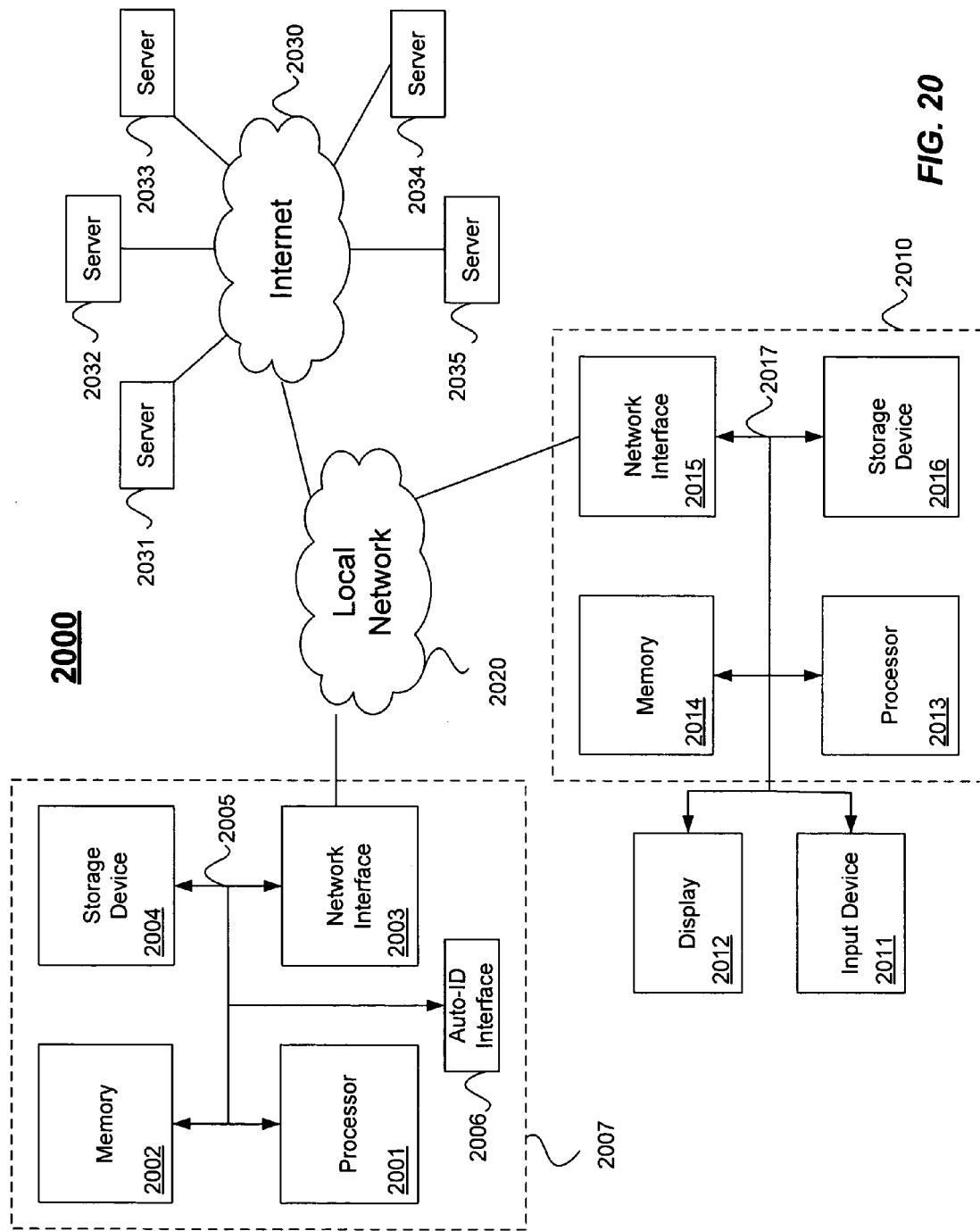
FIG. 20 illustrates an example computer system and networks that may be used to implement one embodiment of the present invention.

FIG. 20 illustrates an example computer system and networks that may be used to implement the present invention. Computer system 2007 may run a gateway and computer system 2010 may run an auto-ID node or application, or both. Applications or auto-ID nodes may also be run on any of servers 2031-2035 and accessed over the Internet 2030. Computer system 2007 receives auto-ID data through an auto-ID interface 2006. Computer system 2007 includes a bus 2005 or other communication mechanism for communicating information between the system hardware components. System 2007 includes a processor 2001 coupled with bus 2005 for processing information. Computer system 2007 also includes a memory 2002 coupled to bus 2005 for storing information and instructions to be executed by processor 2001, such as incoming auto-ID data, rule specifications, or rule processor software. Possible implementations of this memory may be, but are not limited to, random access memory (RAM), read only memory (ROM), or both. A storage device 2004 is also provided for storing information and instructions. Common forms of storage devices include, for example, a hard drive, a magnetic disk, an optical disk, a CD-ROM, a DVD, a flash memory, a USB memory card, or any other medium from which a computer can read.

Computer system 2010 includes a similar configuration as system 2007, but may not include an auto-ID interface. Communication between the gateway and node may be across a standard local network, for example. System 2010 may be coupled via bus 2017 to a display 2012, such as a cathode ray tube (CRT) or liquid crystal display (LCD), for displaying information to a computer user. An input device 2011 such as a keyboard and/or mouse is coupled to bus 2017 for communicating information and command selections from the user to processor 2013. The combination of these components allows the user to communicate with the system.

Computer systems 2007 and 2010 also include network interfaces 2003 and 2015. Network interfaces may provide two-way data communication between each system and the local network 2020. The network interfaces may be a digital subscriber line (DSL) or a modem to provide data communication connection over a telephone line. Another example of the network interface is a local area network (LAN) card to provide a data communication connection to a compatible LAN. Wireless links are another example. In any such implementation, a network interface sends and receives electrical, electromagnetic, or optical signals that carry digital data streams representing various types of information.

Computer system 2007 and 2010 can send and receive information, including auto-ID data, through the network interface to an Intranet or the Internet 2030. In the Internet example, software components or services may reside on multiple different computer systems 2010 or servers 2031 across the network. A server 2031 may transmit or receive information from applications or auto-ID nodes, through Internet 2030, local network 2020, and a network interface to software on computer system 2006 or 2010. The information may then be sent to the processor for execution by a rule engine, for example. The received information may then be processed by a processor and/or stored in storage device 2004, 2016, or other non-volatile storage for later execution. This process of sending and receiving information may be applied to communication between computer system 2007, 2010 and any of the servers 2031 to 2035 in either direction.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

APPENDIX

The following is an example rule specification using XML:

```
Rule 1 - Incoming EPC:
<?xml version="1.0" encoding="UTF-8"?>
<tns:rule ruleid="1" rulename="IncomingEPC"
    xmlns:tns="http://www.dvs1.informatik.tu-darmstadt.de/ECARuleSchema"
    xmlns:xsi="http://www.w3.org/2001/XMLSchema-instance"
    xsi:schemaLocation="http://www.dvs1.informatik.tu-darmstadt.de/ECARuleSchema
ECARuleSchema.xsd ">
    <event>
        <simpleEvent>
            <simpleEventConstraint attribute="type" operator="="
                value="EPC" />
        </simpleEvent>
    </event>
    <action>
        <statement
            description="Request the ASN id associated to the EPC code read">
            <serviceProvider name="LocalRepository" />
            <method name="getASNId" />
            <parameter name="Door" value="Door" type="EVENT" />
            <parameter name="EPCValue" value="EPCValue" type="EVENT" />
            <!-- Things to publish if there is no ASN for the read EPC -->
            <parameter name="topic" value="ECA" type="CONST" />
            <parameter name="type" value="UnexpectedEPC" type="CONST" />
            <parameter name="Door" value="Door" type="EVENT" />
            <parameter name="EPC Value" value="EPCValue" type="EVENT" />
            <return name="ASNId" />
        </statement>
        <statement
            description="Sets a timer for the activities of ASN 'ASNId'">
            <serviceProvider name="Timer" />
            <method name="startTimer" />
```

```xml
            <parameter name="TimerId" value="ASNTimer" type="CONST" />
            <parameter name="TimerName" value="ASNId" type="LOCAL" />
            <parameter name="DueTime" value="30" type="CONST" />
            <!-- Things to publish if timer times out -->
            <parameter name="topic" value="ECA" type="CONST" />
            <parameter name="type" value="ASNTimeOut" type="CONST" />
            <parameter name="ASNId" value="ASNId" type="LOCAL" />
        </statement>
        <statement
            description="Append the received EPC in the Local Repository">
            <serviceProvider name="LocalRepository" />
            <method name="appendEPC" />
            <parameter name="EPCValue" value="EPCValue" type="EVENT" />
            <parameter name="ASNId" value="ASNId" type="LOCAL" />
        </statement>
        <statement
            description="Request the Mote id associated to the EPC code read">
            <serviceProvider name="LocalRepository" />
            <method name="getMoteId" />
            <parameter name="EPCValue" value="EPCValue" type="EVENT" />
            <parameter name="ASNId" value="ASNId" type="LOCAL" />
            <return name="MoteId" />
        </statement>
        <statement description="Query motes for physical conditions">
            <serviceProvider name="MoteGateway" />
            <method name="queryHistory" />
            <parameter name="MoteId" value="MoteId" type="LOCAL" />
        </statement>
        <statement
            description="Set a timer for the mote 'MoteId' query">
            <serviceProvider name="Timer" />
            <method name="startTimer" />
            <parameter name="TimerId" value="MoteTimer" type="CONST" />
            <parameter name="TimerName" value="MoteId" type="LOCAL" />
            <parameter name="DueTime" value="15" type="CONST" />
            <!-- Things to publish if the timer times out -->
            <parameter name="topic" value="ECA" type="CONST" />
            <parameter name="type" value="MoteTimeOut" type="CONST" />
            <parameter name="MoteId" value="MoteId" type="LOCAL" />
        </statement>
        <statement
            description="Check whether all the required data was collected">
            <serviceProvider name="LocalRepository" />
            <method name="checkAllDataCollected" />
            <parameter name="ASNId" value="ASNId" type="LOCAL" />
            <!-- Things to publish if all data was collected -->
            <parameter name="topic" value="ECA" type="CONST" />
            <parameter name="type" value="DataCollectionReady"
                type="CONST" />
            <parameter name="ASNId" value="ASNId" type="LOCAL" />
        </statement>
    </action>
</tns:rule>
```
Rule 2 - Sensor Data
```xml
<?xml version="1.0" encoding="UTF-8"?>
<tns:rule ruleid="2" rulename="IncomingSensorData"
    xmlns:tns="http://www.dvs1.informatik.tu-darmstadt.de/ECARuleSchema"
    xmlns:xsi="http://www.w3.org/2001/XMLSchema-instance"
    xsi:schemaLocation="http://www.dvs1.informatik.tu-darmstadt.de/ECARuleSchema ECARuleSchema.xsd ">
    <event>
        <complexEvent operator="OR">
            <event>
                <simpleEvent>
                    <simpleEventConstraint attribute="type" operator="="
                        value="SensorData" />
                </simpleEvent>
            </event>
            <event>
                <simpleEvent>
                    <simpleEventConstraint attribute="type" operator="="
                        value="MoteTimeOut" />
                </simpleEvent>
            </event>
        </complexEvent>
    </event>
    <action>
        <statement
            description="Stops the timer associated to the MoteQuery">
            <serviceProvider name="Timer" />
```

```
                <method name="stopTimer" />
                <parameter name="TimerId" value="MoteTimer" type="CONST" />
                <parameter name="TimerName" value="MoteId" type="EVENT" />
            </statement>
            <statement description="Appends the history received from the mote in the repository">
                <serviceProvider name="LocalRepository" />
                <method name="appendHistory" />
                <parameter name="MoteId" value="MoteId" type="EVENT" />
                <parameter name="SensorData" value="SensorData" type="EVENT" />
            </statement>
            <statement
                description="Request the ASN Id associated to the MoteID">
                <serviceProvider name="LocalRepository" />
                <method name="getASNIdForMoteId" />
                <parameter name="MoteId" value="MoteId" type="EVENT" />
                <return name="ASNId" />
            </statement>
            <statement
                description="Check whether all the required data was collected">
                <serviceProvider name="LocalRepository" />
                <method name="checkAllDataCollected" />
                <parameter name="ASNId" value="ASNId" type="LOCAL" />
                <!-- Things to publish if all data was collected -->
                <parameter name="topic" value="ECA" type="CONST" />
                <parameter name="type" value="DataCollectionReady"
                        type="CONST" />
                <parameter name="ASNId" value="ASNId" type="LOCAL" />
            </statement>
        </action>
</tns:rule>
Rule 3 - End of Shipment
<?xml version="1.0" encoding="UTF-8"?>
<tns:rule ruleid="3" rulename="EndOfShipment"
    xmlns:tns="http://www.dvs1.informatik.tu-darmstadt.de/ECARuleSchema"
    xmlns:xsi="http://www.w3.org/2001/XMLSchema-instance"
    xsi:schemaLocation="http://www.dvs1.informatik.tu-darmstadt.de/ECARuleSchema
ECARuleSchema.xsd ">
    <event>
        <complexEvent operator="OR">
            <event>
                <simpleEvent>
                    <simpleEventConstraint attribute="type" operator="="
                        value="ASNTimeOut" />
                </simpleEvent>
            </event>
            <event>
                <simpleEvent>
                    <simpleEventConstraint attribute="type" operator="="
                        value="DataCollectionReady" />
                </simpleEvent>
            </event>
        </complexEvent>
    </event>
    <action>
        <statement
            description="Stops the timer for the activities of ASN 'ASNId'">
            <serviceProvider name="Timer" />
            <method name="stopTimer" />
            <parameter name="TimerId" value="ASNTimer" type="CONST" />
            <parameter name="TimerName" value="ASNId" type="EVENT" />
        </statement>
        <statement description="Verify the Shipment readings">
            <serviceProvider name="LocalRepository" />
            <method name="verify" />
            <parameter name="ASNId" value="ASNId" type="EVENT" />
        </statement>
        <statement
            description="Report the Shipment readings to the backend">
            <serviceProvider name="LocalRepository" />
            <method name="report" />
            <parameter name="ASNId" value="ASNId" type="EVENT" />
        </statement>
    </action>
</tns:rule>
Rule 4 - Unexpected (exception handling)
<?xml version="1.0" encoding="UTF-8"?>
<tns:rule ruleid="4" rulename="EPCException"
    xmlns:tns="http://www.dvs1.informatik.tu-darmstadt.de/ECARuleSchema"
    xmlns:xsi="http://www.w3.org/2001/XMLSchema-instance"
```

-continued

```
    xsi:schemaLocation="http://www.dvs1.informatik.tu-darmstadt.de/ECARuleSchema
ECARuleSchema.xsd ">
    <event>
        <simpleEvent>
            <simpleEventConstraint attribute="type" operator="="
                value="UnexpectedEPC" />
        </simpleEvent>
    </event>
    <action>
        <statement description="Reports the read EPC to the backend">
            <serviceProvider name="Backend" />
            <method name="reportUnexpectedEPC" />
            <parameter name="EPCValue" value="EPC" type="EVENT" />
            <parameter name="Door" value="Door" type="EVENT" />
        </statement>
    </action>
</tns:rule>
```

What is claimed is:

1. A method of processing data comprising:
receiving auto-ID data in a first system from a first auto-ID device;
processing the auto-ID data in the first system using a plurality of rules, wherein the rules specify particular processing methods in a plurality of available processing methods on the first system, wherein the plurality of available processing methods comprise one or more activate methods to activate particular rules and one or more deactivate methods to deactivate the particular rules, and wherein when a first activate method is executed, a first rule becomes active and one or more specified processing methods corresponding to the activated first rule are invoked to process said auto-ID data, and wherein when a first deactivate method is executed, the first rule becomes inactive;
sending at least a portion of the auto-ID data to a second system for processing;
receiving, by the first system from the second system, associated information that is associated with the auto-ID data sent to the second system;
querying, by the first system, a second auto-ID device according to the associated information;
receiving, by the first system from the second auto-ID device, sensor data associated with the auto-ID data according to the associated information; and
sending, by the first system to the second system, the sensor data.

2. The method of claim 1 wherein the second system generates a transaction with an application based on the auto-ID data.

3. The method of claim 1 wherein a first predefined rule specifies a predefined combination of auto-ID data to be detected, and one or more methods corresponding to the first predefined rule detects the specified combination of auto-ID data.

4. The method of claim 1 wherein a first predefined rule specifies a condition expression to the auto-ID data, and one or more methods corresponding to the first predefined rule applies the specified condition expression to the auto-ID data.

5. The method of claim 1 wherein the auto-ID data comprise a plurality of auto-ID events, the method further comprising:
executing one or more first methods corresponding to a first predefined rule to detect a predefined combination of received auto-ID events;
executing one or more second methods corresponding to a second predefined rule that applies a condition expression to one or more of the auto-ID events, and executing one or more third methods corresponding to the second predefined rule if the condition expression is satisfied; and
executing one or more fourth methods corresponding to a third predefined rule.

6. The method of claim 1 wherein, in accordance with a method corresponding to at least one rule, at least a portion of the auto-ID data is sent to the second system and used to retrieve the associated information, and wherein the second system sends the associated information to the first system.

7. An apparatus including an auto-ID gateway comprising:
a first input coupled to one or more auto-ID devices to receive auto-ID data from the auto-ID devices;
a first output coupled to at least one auto-ID node to send processed auto-ID data to the auto-ID node;
one or more microprocessors;
memory for storing auto-ID data received from a first auto-ID device; and
a rule engine for processing the auto-ID data using a plurality of rules to produce the processed auto-ID data, wherein the rules specify particular processing methods in a plurality of available processing methods on the auto-ID gateway, wherein the plurality of available processing methods comprise one or more activate methods to activate particular rules and one or more deactivate methods to deactivate the particular rules, and wherein when a first activate method is executed, a first rule becomes active and one or more specified processing methods corresponding to the activated first rule are invoked to process said auto-ID data, and wherein when a first deactivate method is executed, the first rule becomes inactive,
wherein the one or more microprocessors are configured to control the auto-ID gateway to send at least a portion of the auto-ID data to a second system for processing,
wherein the one or more microprocessors are configured to control the auto-ID gateway to receive, from the second system, associated information that is associated with the auto-ID data sent to the second system,
wherein the one or more microprocessors are configured to control the auto-ID gateway to query a second auto-ID device according to the associated information,
wherein the one or more microprocessors are configured to control the auto-ID gateway to receive, from the second auto-ID device, sensor data associated with the auto-ID data according to the associated information, and wherein the one or more microprocessors are configured to control the auto-ID gateway to send, to the second system, the sensor data.

8. The apparatus of claim 7 further comprising a parser for parsing a rule specification, wherein the rule specification specifies one or more of said plurality of rules, and generating one or more rule objects for processing the auto-ID data.

9. The apparatus of claim 7 wherein the rule engine includes an event service for controlling the execution of complex event rules.

10. The apparatus of claim 7 wherein the rule engine includes a condition service for controlling the execution of event conditions of a rule.

11. The apparatus of claim 7 wherein the rule engine includes an action service for controlling the execution of rule actions.

12. The method of claim 1 further comprising:
receiving a rule specification in the first system, wherein the rule specification specifies a plurality of rules;
parsing the rule specification; and
generating, based on the rule specification, a plurality of rule objects for processing auto-ID data, wherein the plurality of rule objects comprise:
one or more event rule objects to detect auto-ID data events;
one or more condition rule objects to execute one or more methods associated with particular condition rules if attributes satisfy particular conditions; and
one or more action rule objects to execute methods specified by said one or more action rules.

13. The method of claim 1 wherein the first system is a gateway system configured between the one or more auto-ID devices and an application, and wherein the second system is configured between the gateway system and the application.

14. The method of claim 13 wherein the second system is configured between the first system and an application.

15. The method of claim 14 wherein the second system processes the at least a portion of auto-ID data for use in the application.

16. The method of claim 14 wherein the second system includes application business logic for processing auto-ID data for use in the application.

17. The method of claim 1 wherein the first rule is initially inactive and a second rule is initially active, wherein the first activate method corresponds to the second rule, and wherein said processing the auto-ID data in the first system comprises:
processing the auto-ID data using a second processing method corresponding to the second rule;
executing the first activate method, and in accordance therewith, activating the first rule; and
processing the auto-ID data using a third processing method corresponding to the first rule.

18. The method of claim 1, wherein processing the auto-ID data in the first system comprises:
executing the first activate method to activate the first rule and to invoke the one or more specified processing methods corresponding to the activated first rule to process the auto-ID data; and
executing the first deactivate method to deactivate the first rule.

19. The method of claim 1, wherein processing the auto-ID data in the first system comprises:
storing a second rule and a third rule, wherein the second rule is active, and wherein the third rule is inactive;
executing at run-time the second rule to activate the third rule; and
executing the third rule.

20. The method of claim 1, wherein processing the auto-ID data in the first system comprises:
storing a second rule and a third rule, wherein the second rule is active, and wherein the third rule is inactive;
executing at run-time the second rule to activate the third rule;
executing the third rule; and
executing at run-time the second rule to deactivate the third rule.

* * * * *